United States Patent [19]

Sudharsanan et al.

[11] Patent Number: 5,764,698
[45] Date of Patent: Jun. 9, 1998

[54] METHOD AND APPARATUS FOR EFFICIENT COMPRESSION OF HIGH QUALITY DIGITAL AUDIO

[75] Inventors: Subramania Sudharsanan, Hudson, Mass.; Selvarathinam Suthakaran, Deerfield Beach, Fla.

[73] Assignee: International Business Machines Corporation, Armonk, N.Y.

[21] Appl. No.: 175,900

[22] Filed: Dec. 30, 1993

[51] Int. Cl.$^6$ .............................. H03M 7/34; H04J 15/00; H04B 1/66; G01L 3/02
[52] U.S. Cl. .......................... 375/241; 370/118; 341/51; 381/29; 381/30
[58] Field of Search .................. 381/29, 30, 35; 375/240, 241, 245, 377; 370/118; 341/51; 395/2, 2.1, 239

[56] References Cited

U.S. PATENT DOCUMENTS

| | | |
|---|---|---|
| 4,631,746 | 12/1986 | Bergeron et al. . |
| 4,688,246 | 8/1987 | Eilers et al. . |
| 4,899,384 | 2/1990 | Crouse et al. . |
| 4,969,192 | 11/1990 | Chen et al. . |
| 5,150,387 | 9/1992 | Yoshikawa et al. ............ 375/240 |
| 5,150,401 | 9/1992 | Ashby, III, et al. . |
| 5,185,800 | 2/1993 | Mahieux . |
| 5,214,678 | 5/1993 | Rault et al. .................... 375/240 |
| 5,231,484 | 7/1993 | Gonzales et al. . |
| 5,301,255 | 4/1994 | Nagai et al. . |
| 5,311,561 | 5/1994 | Akagiri ........................... 375/240 |
| 5,381,143 | 1/1995 | Shimoyoshi et al. . |
| 5,469,474 | 11/1995 | Kitabatake ..................... 375/240 |
| 5,490,170 | 2/1996 | Akagiri et al. ................. 375/240 |

FOREIGN PATENT DOCUMENTS

93/10634  5/1993  WIPO .

OTHER PUBLICATIONS

Raymond N.J. Veldhuis, "Bit Rates in Audio Source Coding", IEEE Journal on Selected Areas in Communications, vol. 10, No. 1, Jan. 1992. pp. 86–96.

Gerard C.P. Lokhoff, "dcc–Digital Compact Cassette", IEEE Transactions on Consumer Electronics, vol. 37, No. 3, Aug. 1991. pp. 703–706.

Gerard C.P. Lokhoff, "Precision Adaptive Subband Coding (PASC) for the Digital Compact Cassette (DCC)", IEEE Transactions on Consumer Electronics, vol. 38, No. 4, Nov. 1992. pp. 784–789.

Hans Georg Musmann, "The ISO Coding Standard", IEEE Transactions and Exhibit, vol. 1 of 3, Dec. 1990. pp. 511–517.

Yves Francois Dhery, et al, "A Musicam Source Codec for Digital Audio Broadcasting and Storage", ICASSP 91, vol. 5, May 1991. pp. 3605–3608.

Greg Maturi, "Single Chip MPEG Audio Decoder", IEEE Transactions on Consumer Electronics, vol. 38, No. 3, August 1992. pp. 348–356.

Berthold Burkardtsmaier, "The Musicam Taxi System", Dialog4 System Engineering GmbH, Businesspark Monrepos, D–7140, Ludwigsbg, Germany. pp. 148–154.

(List continued on next page.)

*Primary Examiner*—Edward L. Coles, Sr.
*Assistant Examiner*—Kimberly A. Williams
*Attorney, Agent, or Firm*—Duke W. Yee; Andrew J. Dillon

[57] ABSTRACT

A method and system for efficiently compressing a digital audio signal, wherein the digital audio signal includes a plurality of samples. Each of the samples are separated into a plurality of subbands. A signal to mask ratio (SMR) for each the subbands is predicted utilizing a model of relationships between energy values within each of the subbands and SMR values based on a predetermined psychoacoustic model. A number of are allocated bits in response to the predicted SMR and a preselected bit-rate. Then, each of the subbands are quantized based on the number of bits allocated, wherein the digital audio signal may be efficiently compressed.

23 Claims, 6 Drawing Sheets

OTHER PUBLICATIONS

Masahiro Iwadare, et al. "A Robust 384 kbit/s Stereo HiFi Audio Codec for ISDN Applications", C&C Systems Research Laboratories, R&D Planning Office, NEC Planning Office, 1952. pp. 1952–1956.

R.N.J. Veldhuis, et al. "Subband Coding of Digital Audio Signals", Phillips Journal of Research, vol. 44, Nos. 2/3, 1989. pp. 329–343.

Karlheinz Brandenburg, et al. "The ISO/MPEG–Audio Codec: A Gerneric Standard for Coding of High Quality Digital Audio", An Audio Engineering Society Preprint, Mar. 1992. pp.1–16.

ISO–IEC/JTC1 SC29/WG11, Coding of Moving Pictures and Associated Audio for Digital Storage Media At Up to About 1.5 Mbits/s–Part 3: Audio, DIS, 11172, Apr. 1992.

METHOD AND APPARATUS FOR EFFICIENT COMPRESSION OF HIGH QUALITY DIGITAL AUDIO

BACKGROUND OF THE INVENTION

1. Technical Field

The present invention relates in general to an improved method and apparatus for efficiently transmitting data from a source apparatus to a receiving apparatus. In particular to the present invention relates to a method and apparatus for compressing data for transmission. Still more particularly, the present invention relates to a method and apparatus for compressing digital audio data.

2. Description of the Related Art

Within a data processing system, a system data bus may be utilized to transmit data to and from a central processing unit, direct access storage devices, communications input/output processors (IOPs), and other peripheral devices. Typically, only one of the several devices connected to the system data bus is able to transmit at any given moment. One of the parameters which establishes the volume of information that the system data bus can transfer within a given period of time, or the capacity of the system data bus, is the bandwidth of the system data bus. The bandwidth of a data bus is the rate, expressed in bytes per second, at which data can be conveyed from a source to a target, such as a workstation or other receiving device connected on the bus. Such bandwidth is limited by the electrical characteristics of the transceivers connected to the system data bus, and the electrical characteristics of the system data bus itself.

Similarly, a communication link may be utilized to transmit data from a source processor to a workstation within a distributed data processing system. Such a communication link also has a finite bandwidth which limits the capacity or volume of information that may be transmitted via the communications link.

In data bus design, and in communication link design, data transmission capacity is a resource that may be divided among several devices connected to such communication channels. As more devices are connected to such communications channels, and as the volume of data communicated between devices on such channels increases, the need to conserve channel capacity and optimize channel usage becomes increasingly important.

Recently, data processing systems have been utilized to process, present, and transmit files containing multimedia data. Multimedia data is a collection of "time-related" or "time-based" data files which may be utilized to represent video, sound, and animation. Such multimedia data files are typically quite large. For example, at 300 pixels per inch and 24 bits per pixel, an 8½-by-11-inch color picture requires more than 25 megabytes of data storage.

In order for a workstation to "play back" the digital audio portion of a multimedia presentation consisting of 16-bit samples in stereo at a sample rate of 44.1 kilohertz (CD audio quality), the workstation must receive 176 kilobytes of sound data per second. Full screen digital video at a resolution of 640 by 480 pixels utilizing 256 colors and a frame rate of 15 frames per second requires the transmission of 36.9 million bits per second to the presenting workstation. Additional colors, pixels, or frames per second further increases these data transmission requirements.

One method of increasing the capacity of the system data bus or the communications link is to transmit data more efficiently by transmitting data in a compressed format. Data compression is the process of eliminating gaps, empty fields, redundancies, and unnecessary data in order to shorten the length of a data file.

For many years, software and hardware designers have employed various data compression schemes to increase the efficiency of data communication channels and storage devices. An example of one such data compression scheme is the Moving Pictures Experts Group (MPEG) standard. MPEG is part of a joint technical committee of the International Standards Organization (ISO) and the International Electrotechnical Commission (IEC). The MPEG standards for audio may be found in ISO-IEC/JTC1 SC29/WG11, *Coding Of Moving Pictures And Associated Audio For Digital Storage Media At Up to About 1.5 Mbits/s—Part 3: Audio*, DIS, 11172, April 1992.

Basically, MPEG sets forth standards for data compression and may be applied to various signals such as audio and video. Generally, the compression of any data object, such as a page of text, an image, a segment of speech or music, or a video sequence may be thought of as a series of steps, including: (1) a decomposition of that object into a collection of "tokens"; (2) the representation of those tokens by binary strings which have a minimal length in some sense; and (3) the concatenation of the strings in a well defined order. With respect to audio data, subband coding is employed to compress audio data. In compressing audio data, the tokens for audio data are subbands. A "subband" is a frequency band in a frequency domain.

With the proliferation of MPEG decoding methods for video and associated audio in the computer and consumer electronics industry, relatively inexpensive encoding systems have become vital. Compression schemes (also referred to as "encoding" schemes), like MPEG, typically require more processing power at the encoding end than at the decoding or receiving end. While special purpose hardware is being developed for video, audio encoding has mainly been implemented in existing programmable digital signal processors (DSPs). Such an implementation usually requires multiple floating-point DSPs for a real-time implementation. Such implementations increase the cost of hardware for encoding audio because of the hardware required to perform the required encoding function.

Therefore, it would be advantageous to have a method and apparatus that provides an MPEG encoding process or any other encoding process utilizing subband coding for high quality reproduction while minimizing the amount of hardware needed for such an implementation.

SUMMARY OF THE INVENTION

It is therefore one object of the present invention to provide an improved method and apparatus for efficiently transmitting data from a source apparatus to a receiving apparatus.

It is another object of the present invention to provide a method and apparatus for compressing data for transmission.

It is yet another object of the present invention to provide a method and apparatus for efficiently compressing high quality digital audio data.

The foregoing objects are achieved as is now described. The present invention provides a device for use in determining bit allocation, which in turn provides the required input to enable adaptive quantization of a digital audio signal that has been divided into subbands.

The method and system of the present invention permit the efficient compressing of a digital audio signal, wherein the digital audio signal includes a plurality of samples. Each of the samples are separated into a subbands. A signal to mask ratio (SMR) for each the subbands is predicted utilizing a model of relationships between energy values within each of the subbands and SMR values based on a predetermined psychoacoustic model. A number of bits are allocated in response to the predicted SMR. Then each of the subbands are quantized based on the number of bits allocated, wherein the digital audio signal may be efficiently compressed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The method proposed by MPEG for compression of digital audio is based on subband coding (SBC). A SBC scheme initially splits the incoming signal into multiple signals that correspond to various bandwidths that comprise the entire spectrum of the signal. Then the signals are quantized according to either a pre-specified or a dynamic bit-allocation scheme. The compression algorithms that attempt to preserve the original quality as much as possible usually employ a dynamic bit allocation scheme. In the MPEG audio scheme, the bit-allocation is based upon a perceptual model of the human ear. The perceptual model, commonly known as a psychoacoustic model, utilizes the spectral information content of the incoming signal and outputs a vector of values that correspond to the signal to mask ratios (SMR) in each subband. SMR values are then used for obtaining a bit-allocation table. MPEG recommends two different such models, Psychoacoustic Model 1 (PM1) and Psychoacoustic Model 2 (PM2). More information on MPEG and PM1 and PM2 may be found in ISO-IEC/JTC1 SC29/WG11, *Coding Of Moving Pictures And Associated Audio for Digital Storage Media At Up to About 1.5 Mbits/s—Part 3:Audio*, DIS, 11172, April 1992.

Figure 1:
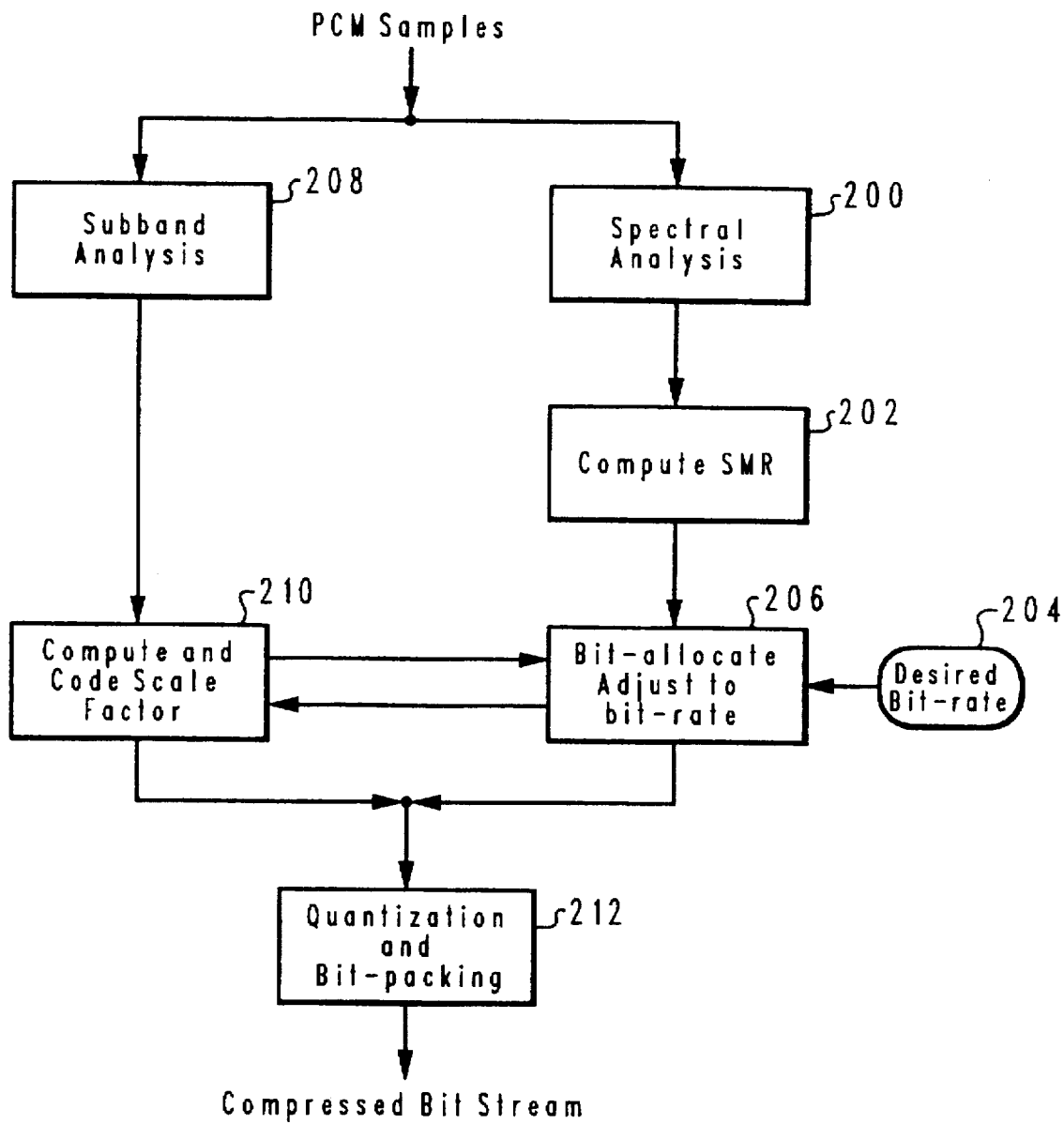
FIG. 1 depicts a high level flowchart of a known encoding process.

With reference to FIG. 1 a high level flowchart of a known process for encoding audio is depicted. This process may be implemented with MPEG standards or by other encoding schemes. Pulse code modulation (PCM) samples are processed utilizing spectral analysis, as illustrated in block 200, to provide data to compute a signal to mask ratio (SMR) for the sample, as depicted in block 202. The SMR value from block 202 and the desired bit-rate from block 204 are employed to determine bit allocation, as illustrated in block 206. Bit allocation is performed to allocate bits available for storage or transmission of PCM samples in a subband. The number of bits allocated depends on the SMR value computed in block 202. SMR values are used in conjunction with signal to Noise Ratios (SNR) resulting from quantization of the signal to allocate the number of bits needed for quantization in each subband. Generally, a high SMR results in more bits being allocated, while a low SMR causes less bits to be allocated for encoding. U.S. Pat. No. 4,899,384 teaches table controlled bit allocation in a variable rate subband speech coder, and U.S. Pat. No. 5,185,800 discloses a bit allocation device for transformed digital audio signals with adaptive quantization based on psychoauditive criterion.

PCM samples also are processed utilizing subband analysis, as illustrated in block 208. Subband analysis involves producing subbands for encoding. The subbands may be selected by the user or specified by an encoding standard, such as MPEG. The subbands may be produced from the PCM samples by filtering the PCM samples with cosine modulated filters to produce the desired subbands. Each filter is employed to separate a subband from the PCM samples. A number of different filters may be utilized to select the desired subbands from the PCM samples, depending on the subbands desired or specified. Examples of various filter designs may be found in H. S. Malvar, *Signal Processing With Lapped Transforms*, Artech House (1992); Ziemer et al, *Signals and Systems: Continuous and Discrete*, Macmillian Publishing Co., Appendix D (2d ed. 1989) and Horowitz and Hill, *The Art of Electronics*, Cambridge University Press (2d ed. 1989). U.S. Pat. No. 4,899,384 teaches the use of a parallel filter bank to produce subbands. Filters may be implemented in hardware or in software in accordance with a preferred embodiment of the present invention.

A scale factor is then determined and coded for each of the subbands separated from each of the PCM samples factor, as illustrated in block 210. For each "frame" of audio PCM samples, a prespecified number of subband samples per subband are obtained. For instance in Layer I, a frame consists of 384 PCM samples which results in 384/32=12 subband samples per subband. In Layer II, these numbers are 1052 and 36 respectively. The absolute maximum of the 12 samples is taken as the scale factor. To prevent an infinite number of choices for the scale factor, only 64 values are used in Layer I and II. Hence the scale factor value that is higher and closest to this absolute maximum value is chosen and indicated to the decoder by an index. The decoder is assumed to know the value indexed. The scale factor requires bits for coding and is taken into account when bit allocation is performed in block 206.

Then quantizing and bit packing is performed, as depicted in block 212. Each subband value is divided by the scale factor value corresponding to the subband. Now the scaled subband samples are quantized by quantizers whose step sizes are determined by the SMR and SNR values. Then the bits resulting from the quantization process are packed to conform to the MPEG audio bit stream definitions in the case of MPEG or any other standard that is used. U.S. Pat. No. 5,185,800 discloses a bit allocation device for transformed digital audio signals with adaptive quantization based on psychoauditive criterion. More information on quantizing and encoding also may be found in Ziemer et al, *Signals and Systems: Continuous and Discrete*, Macmillian Publishing Co. (2d ed. 1989).

The result is a compressed bit stream. This process may be implemented under MPEG or other encoding standards for compressing data. More details of the process illustrated in FIG. 1 may be found in ISO-IEC/JTC1 SC29/WG11, *Coding Of Moving Pictures And Associated Audio for Digital Storage Media At Up to About 1.5 Mbits/s—Part 3: Audio*, DIS, 11172, April 1992.

In the MPEG audio standard, three different layers are involved. Layers I and II split the signal into 32 uniformly spaced subbands using a cosine modulated filter bank as specified in ISO-IEC/JTC1 SC29/W11, *Coding Of Moving Pictures And Associated Audio for Digital Storage Media At Up to About 1.5 Mbits/s—Part 3: Audio*, DIS, 11172, April 1992. Layer III also uses 32 subbands in the initial stage but further splitting is performed within the subbands to obtain subband samples of finer frequency divisions. In Layer I, the 384 samples are grouped together in a frame and a new bit-allocation table is computed for each of these frames. Under MPEG standard, the psychoacoustic models use a 512-point discrete Fourier transform (DFT) to compute the spectrum. For the permitted samples rates of 32, 44.1 and 48 kHz, this translates into the requirement of performing bit-allocation computation for each 12, 8.7 and 8 milliseconds. For Layer II, 1152 (3×384) samples are grouped together in a frame and a 1024-point DFT is used for spectral analysis. The computational requirement for computing the PM2 while Layer II is employed can be derived as 26,314 multiplies, 37,341 adds, 1024 compares, 1135 logarithms, 1201 table index operations, 859 divides, 768 square roots and 512 inverse tangents per 6 ms or approximately 170 times a second for a two-channel (stereo) audio. See ISO-IEC/JTC1 SC29/WG11, *Comments On Audio CD And Analysis Of Audio Complexity*, May 1991 for more information.

A preferred embodiment of the present invention provides a process for bit allocation that can be computationally 70 times more efficient than the PM2 for Layer II, and about 60 times more efficient than PM1 for Layer I is provided. The present invention is well suited for standard digital processor architectures.

The present invention predicts SMR values based on the energy in a subband rather than by spectral analysis as depicted in FIG. 1. The subbands obtained from subband analysis are utilized to predict the SMR value utilized in bit allocation. Specifically, the subband energy is employed in accordance with a preferred embodiment of the present invention. The prediction of the SMR value is accomplished by utilizing a matrix of prediction coefficients indexed by subbands. The prediction coefficients are found by utilizing actual psychoacoustic models, such as PM1 and PM2. Details of the methodology used in accordance with a preferred embodiment of the present invention are presented in the following sections. Utilizing this approach, dynamic bit allocation schemes for any subband codes may be developed in accordance with a preferred embodiment of the present invention.

A Simplified Modelling of SMR Computation

Detailed descriptions of the models PM1 and PM2 can be found in ISO-IEC/JTC1 SC29/WG11, *Coding Of Moving Pictures And Associated Audio for Digital Storage Media At Up to About 1.5 Mbits/s—Part 3: Audio*, DIS, 11172, April 1992. These models involve lengthy processes for computation of the SMR. For instance, in PM1, first the DFT is performed to obtain the power density spectrum of the signal. From the power spectrum, tonal and non-tonal components of the signal are computed since it is well known that these components have different masking characteristics. These masking characteristics can cross the boundaries (or cut-off frequencies) of the subbands. The global masking thresholds are thresholds and various frequency points are then computed. Minima of these values within each subband represent the SMR. PM2 requires more complex operations using both magnitude and phase of the DFT and is detailed in ISO-IEC/JTC1 SC29/WG11, *Coding Of Moving Pictures And Associated Audio for Digital Storage Media At Up to About 1.5 Mbits/s—Part 3: Audio*, DIS, 11172, April 1992.

The subband samples represent the temporal information within their respective bandwidths. Assuming that each subband provides perfect bandpass characteristics, the summation of the square of each subband value within a subband reflects the energy in that frequency band by the application of Parseval's Theorem as described in A. V. Oppenheim and R. W. Schafer, *Digital Processing of Signals*, Englewood Cliffs, N.J.: Prentice Hall, 1979. The analysis filter bank that provide subband decomposition has been designed using a prototype filter that provides more than 96 dB attenuation in the stop band. See K. Brandenberg and G. Stoll, "The ISO/MPEG-Audio codec: A generic standard for coding of high quality digital audio," *Proc. of the 92nd Convention of the Audio Engineering Society*, Vienna, March 1992 for more information.

Hence, for all practical purposes, a perfect bandpass characteristics assumption is valid. Since is evident from the computational procedure for the SMR that the energy values within each subband ultimately contributes to the SMR value within that subband and the neighboring subbands, it is fair to model a relationship between the energies within each subband and the SMR values. If the model is known, computation of the frequency spectrum and the related operations will be avoided since energies will be computed in the subband domains. A preferred embodiment of the present invention employs is linear modelling.

The problem of finding a linear model translates simply into estimating a matrix of dimension 32 by 33 to map the energy values into an array of SMR values. The initial step, of course, is to obtain data for modelling. Once the data is obtained, finding the best model that fits the data is the next step in the process. First, the mechanism for collecting the data will be examined. Next, the appropriate input and output data sets will be selected. Then, the linear hypothesis will be tested to support the arguments for a linear model. Finally, actual estimation of the matrix will be conducted in accordance with a preferred embodiment of the present invention.

Data Collection and Hypothesis Testing

The data collection procedure requires that a good psychoacoustic model be used to obtain sample SMR values. A software has been used to obtain SMR values via the two psychoacoustic models described in ISO-IEC/JTC1 SC29/WG11, *Coding Of Moving Pictures And Associated Audio for Digital Storage Media At Up to About 1.5 Mbits/s—Part 3: Audio*, DIS, 11172, April 1992. PM1 and PM2 both have been used in experiments. To obtain a set of data for the estimation problem, a variety of music and speech signals are needed. A multitude of audio samples from classical and popular music, and some speech signals varying between 20 and 30 seconds of duration was captured in monoaural mode at 44.1 kHz sampling rate with 16 bit resolution per sample using the IBM Audio Capture and Playback Adapter (ACPA).

A similar approach may be taken to capture data at 32 and 48 kHz samples techniques as well. If the samples are available digitally, there will be no need for using an audio capturing hardware. A table of time domain energy values in each subband and the corresponding SMR values from an established psychoacoustic model for several frames of audio may be produced using the simulation programs. If the data from all of the different musical samples were to be collected, one would end up with a prohibitively large data set. To circumvent this problem, a sampling technique was employed. A pseudorandom number generator with uniform distribution characteristics was utilized for sampling purposes. Let the random number that lies between 0 and $2^{15}-1$ be denoted by $w_i$. Then $$P((w_i \bmod 100) > x) = (100-x)/100$$

for integer x, $0 \leq x \leq 100$, where mod indicates the modulo operation and P(.) denotes the probability measure. Using the above, SMR and corresponding energy values were obtained for each frame, randomly, which resulted in capturing (100−x) percent of the frames.

Data corresponding to Layer I and Layer II were obtained using PM1 and also PM2. For the energy computations, the absolute values of the subband samples were considered instead of the square of the samples in accordance with a preferred embodiment of the present invention. This was done to minimize the computational or cycle requirements in programmable DSPs. The absolute values of the subband samples are referred to herein as "pseudo-energy" values. While a modelling for Layer 1, in each frame for each subband 12 absolute values of the samples were summed together to obtain the energy value in that subband. While using Layer II, 36 absolute values were summed to obtain the pseudo-energy values.

One difficulty is that these energy values are usually small which can in turn result in large values for the linear parameters that are to be determined. This may require dealing with a large dynamic range of numbers which may not be preferable in implementations using fixed-point DSPs. For this reason, modified values were utilized by taking the natural logarithm of this energy. This is also appropriate considering the fact that SMR values are given in dB. In parallel with the pseudo-energy value calculations, SMR values were computed using either PM1 or PM2 and gathered. Let $y_k(j)$ denote the SMR value for the subband k at the sample frame j and let $x_i(j)$ be the corresponding subband pseudo-energy value.

$\beta_{k,i}$, k=1,2, ...,32 and i=1,2, ...,33 is estimated using N data points such that:

$$y_k(j) = \sum_{i=1}^{33} \beta_{k,i} x_i(j) + \epsilon_k(j), j = 1, 2, \ldots, N \qquad \text{equation (1)}$$

where $x_{33}(j)=1$ for all j=1,2, ...,N and $\epsilon_k(j)$ represent the modeling error for subband k at frame j. $\beta_{k,33}$ (k=1,2,...,32) represent bias values, and $\beta_{k,i}$ represents prediction coefficients in accordance with a preferred embodiment of the present invention. In the depicted example, a "frame" contains a number of adjacent audio samples. The aim is to obtain an estimate of $\beta_{k,i}$ such that the errors are small for the given data. Note that the number of parameters to be estimated are 32×33. The additional 32 parameters come from the requirement to estimate a bias vector that correspond to $x_{33}(.)$.

Figure 2:
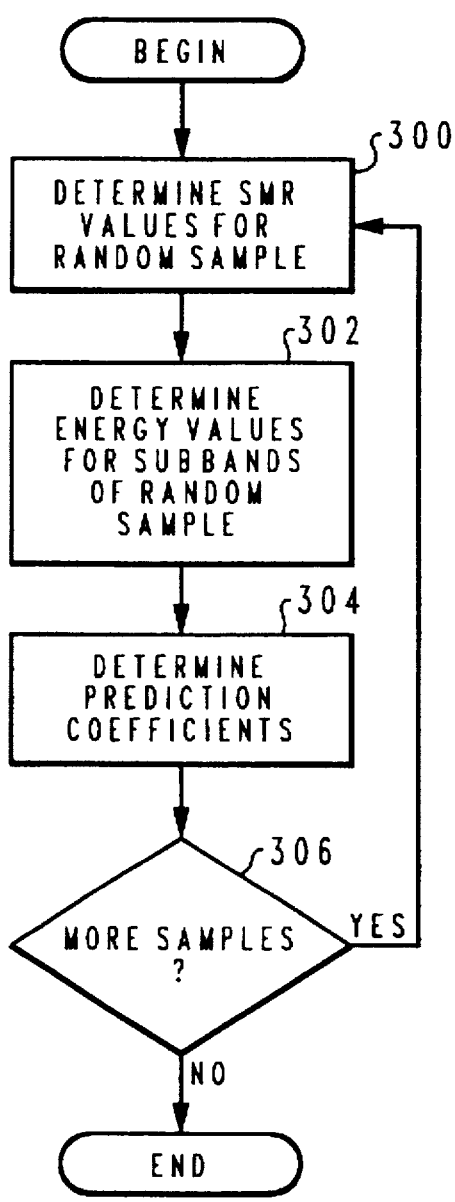
FIG. 2 is a high level flowchart of a process for determining prediction coefficients in accordance with a preferred embodiment of the present invention.

Referring now to FIG. 2, a process for determining prediction coefficients is illustrated in accordance with a preferred embodiment of the present invention. A SMR values are determined for a random audio sample utilizing a psychoacoustic model, such as PM1 or PM2, as depicted in block 300. Thereafter energy values for the subbands in the sample are determined, as illustrated in block 302. Then a prediction coefficient is determined for each subband and data point, as depicted in block 304. The prediction coefficients are $\beta_{k,i}$ as shown in equation (1). Then, a determination of whether more samples are present is made, as illustrated in block 306. If no more samples are present, the process terminates. Otherwise, the process returns to block 300 to process another audio sample in accordance with a preferred embodiment of the present invention.

The hypothesis that the linear mapping equation (1) is significant can easily be checked under certain assumptions, namely, the errors ek(j) are independent and normally distributed. Details of hypothesis testing can be found in a standard statistics text such as J. Neter, W. Wasserman, M. H. Kutner, *Applied Linear Statistical Models*, Homewood, Ill.: Richard Irwin Inc., 1985. For instance, for subband k one can formulate the null and the alternate hypotheses as:

$H_0$: $\beta_{k,1}=\beta_{k,2}= \ldots =\beta_{k,32}=0$ $H_1$: $\beta_k$, i≠0 for at least one i Rejection of $H_0$ implies that at least one variable in the model contributes significantly. The computation of the test statistic first involves the calculation of an estimate of $b_k=[\beta_{k,0}, \beta_{k,1}, \ldots, \beta_{k,32}]^T$, $\hat{b}_k$. Let $y_k=[y_k(1), y_k(2), \ldots, y_k(N)]^T$ and X be an N by 33 matrix such that each row of X contains $x_i(j)$, i=1,2,...,33. Similarly, $e_k$ denotes the error vector. Then equation (1) is written as $$y_k = Xb_k + e_k$$

and it is well known that the least square estimate of $b_k$ is given by $$\hat{b}_k = (X^T X)^{-1} X^T y_k \qquad \text{equation (2)}$$

where the superscript $T$ denotes matrix transposition. Note that under the normality assumption for error $e_k$, the estimate given by equation (2) is also the maximum likelihood estimate (MLE) of $b_k$.

Let C be a 32 by 33 matrix such at C=[I o] where I is the 32 by 32 identity matrix and o is a 32 dimensional column vector with all zero elements. Then, the test statistic $F_0$ is then computed as:

$$F_0 = \frac{\hat{b}_k^T [C(X^T X)^{-1} C^T]^{-1} \frac{C\hat{b}_k}{32}}{\hat{e}_k^T \hat{e}_k / (N-33)} \qquad \text{equation (3)}$$

where $\hat{e}^T_k = y_k - X\hat{b}_k$, the vector of residuals. Ho if $F_0 > F_{\alpha,32,N-33}$, values of which are found in the variance ratio distribution tables (or F tables) in standard statistical references such as J. Neter, W. Wasserman, M. H. Kutner, *Applied Linear Statistical Models*, Homewood, Ill.: Richard Irwin Inc., 1985. Some typical values of the test statistic $F_0$ encountered are tabulated in Table 1 for a case where data using Layer 1, PM1 with N=390 was gathered.

TABLE 1

Variance Ratio Table for Hypothesis Testing

| Subband | $F_0$ | $F_{\alpha,32,N-33}$ |
|---|---|---|
| 1 | 7.66 | 1.9 |
| 7 | 22.34 | 1.9 |
| 11 | 55.68 | 1.9 |
| 19 | 134.06 | 1.9 |
| 24 | 217.36 | 1.9 |
| 31 | 159.79 | 1.9 |

The results in Table 1 are typical for all the data that was gathered; Layer II, Layer I with various combinations of PM1 and PM2. Thus, It is very clear that the null hypothesis should be rejected and estimation should proceed.

Estimation

Figure 3:
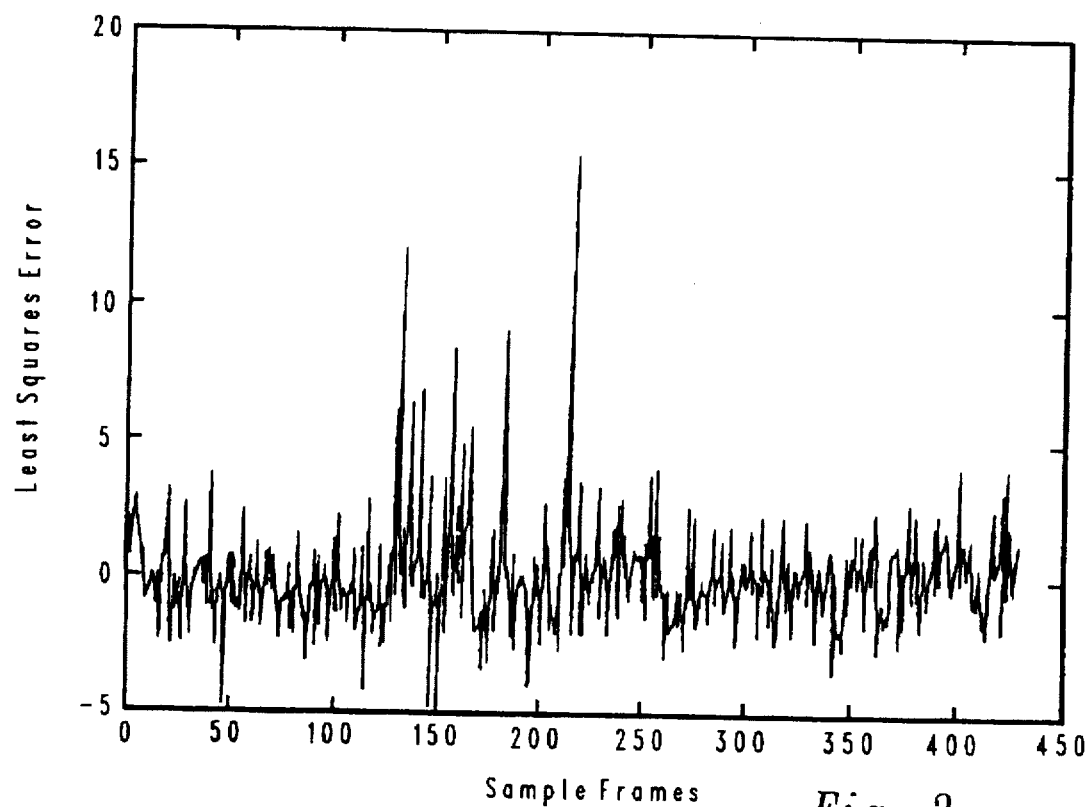
FIG. 3 depicts a graph of a typical error profile when a least squares estimate is utilized.

It is fairly well known that equation (2) provides the Best Linear Unbiased Estimate of $b_k$ under the normality assumptions. However, due to outliers—the data points at which the errors are considerably larger, and the lack of knowledge about the distribution of the errors, different type of estimators may have to be utilized. A typical result of using least squares estimate of $b_k$ by plotting the errors for sample frames is illustrated in FIG. 3. In view of FIG. 3, it is indeed clear that elimination of certain points can very well contribute to better estimation of $b_k$. A technique known as robust estimation has been deemed as an appropriate alternative to least squares technique in the presence of outliers.

Figure 4:
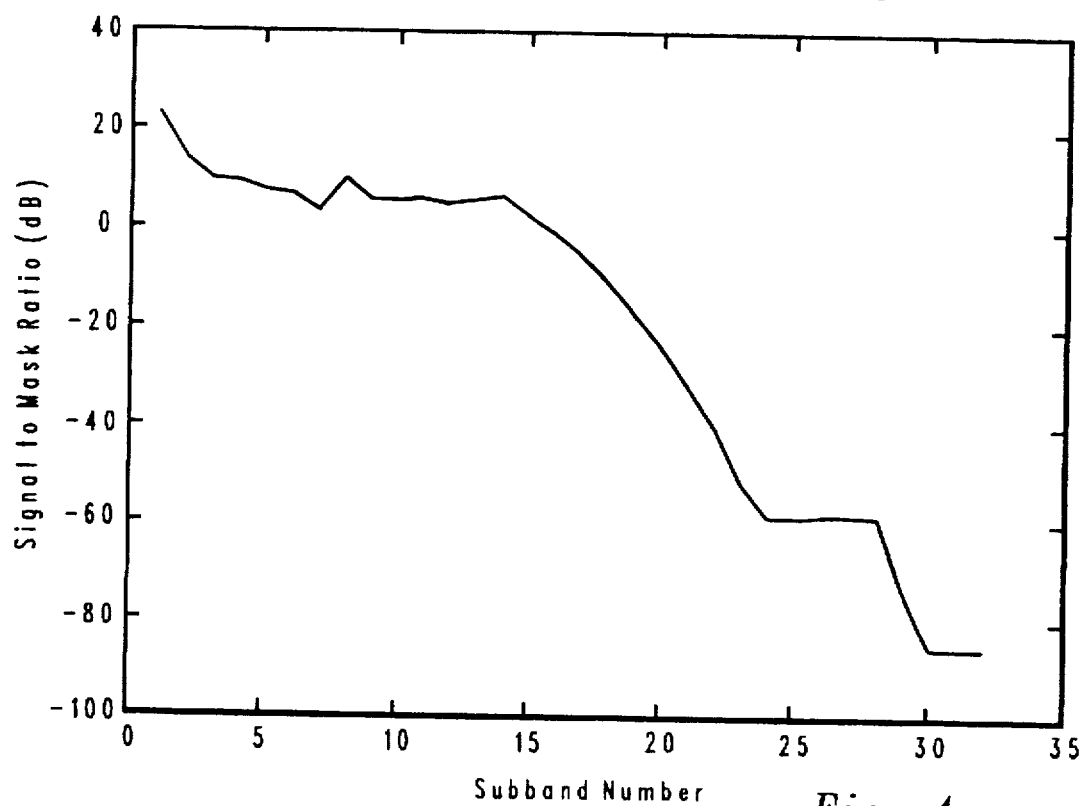
FIG. 4 is a graph of signal to mask ratios distributed over a number of subbands.

Many robust estimation techniques have been proposed in the literature. Two available techniques were employed. One of the methods is by Boncelet and Dickinson in C. G. Boncelet and B. W. Dickinson, "A variant of Huber robust estimation," SIAM, *Journal on Scientific and Statistical Computing*, vol. 5, no. 3, pp. 720–734, 1984 which is a variant of Huber's method described in P. Huber, "Robust statistics: A review," *Annals of Mathematical Statistics*, vol. 43, pp. 1042–1067, 1972. The estimates can be obtained by minimizing $$\sum_{j=1}^{N} \rho\left( y_k(j) - \sum_{i=1}^{33} \beta_{k,i} x_i(j) \right) \qquad \text{equation (4)}$$

where $$\rho(x) = \begin{cases} \lambda x - \frac{\lambda^2}{2}, & x \geq \lambda \\ \frac{x^2}{2}, & -\lambda \leq x \leq \lambda \\ -\lambda x - \frac{\lambda^2}{2}, & x \leq \lambda \end{cases}$$

with respect to $\beta_{k,i}$. Usually the value of $\lambda$ is not known beforehand and using fixed values for $\lambda$ considerably reduces the computational burden. Another alternative is to specify the percentage of outliers (say $\alpha$) permitted for the design. The scheme proposed by Boncelet and Dickinson C. G. Boncelet and B. W. Dickinson, "A variant of Huber robust estimation," SIAM, *Journal on Scientific and Statistical Computing*, vol. 5, no. 3, pp. 720–734, 1984 can be used for either case, using the percentage of the outliers or using a fixed value for $\lambda$. Fixing $\lambda$ requires a priori knowledge about the data. The following are properties of the SMR values that can be used towards selecting appropriate $\lambda$ values:

(1) The SMR values include the absolute threshold values in each subband. Absolute threshold values are the values that correspond to minimum sound energy levels that are needed for being audible;

(2) These values are larger in the high frequency range (13–20 kHz) and smaller in the lower middle frequency (2–5 kHz) since the ear is most sensitive in this frequency range. Very low frequencies (0–300 Hz) also have large absolute threshold. (For a listing of absolute threshold values for various frequencies, see ISO-IEC/JTC1 SC29/WG11, *Coding Of Moving Pictures And Associated Audio for Digital Storage Media At Up to About 1.5 Mbits/s*—Part 3: Audio, DIS, 11172, April 1992);

(3) The SMR values (given in dBs) directly relate to the number of bits to be allocated within each subband. For each bit allocated, the signal to noise ratio (SNR) reduces by approximately 6 dB; and (4) Typical profile of the SMR values plotted against the subband numbers is depicted in FIG. 4. This figure shows that the SMR values generally decrease as the frequency increases.

In view of the properties listed above, it is important to predict the SMR values as accurately as possible in the low to lower high frequencies (2–13 kHz). One may choose low (<3 dB) values for $\lambda$ and low values for $\alpha$. Although the ear sensitivity is not great in the very low frequencies, the SMR values are usually high. Hence, $\lambda$ is kept around 6 dB for the first three subbands (up to about 2 kHz). Alternatively, $\alpha$ could be selected to be around 5%. For subbands above 20, the SMR values are larger in general and the ear is less sensitive. This in turn permits the use larger $\lambda$ values. Typically, values up to about 10 were employed. However, the percentage of outliers, $\alpha$ need not be increased to higher levels if the scheme is to be run by specifying a $\alpha$ in the very low frequency range.

One may suspect that there could be noticeable differences in the characteristics of the data generated under different conditions for a particular layer, viz the differences resulting from the use of PM1 and PM2. Experience suggests that this is indeed the case for certain types of music. However, the general remarks on the selection of $\lambda$ still hold.

Estimations using Huber's technique with modifications suggested by Holland and Welsh in P. W. Holland and R. E. Welsch, "Robust regression using iteratively reweighted least squares," *Comm. Statisi.*, vol. A6, pp. 813–827, 1977 were performed. The procedure is based on an iterated least squares technique that starts with an initial estimate of the regression parameter vector, which is usually obtained by at least absolute residual estimation. An implementation of this scheme is available in AGSS (A Graphical Statistical System), which is a product available from International Business Machines. One advantage of this method is that automatic computation of $\lambda$. Here $\lambda=1.345\sigma^\wedge$, where $\sigma^\wedge$ is the estimated variance of the residuals. The technical details of this robust estimation procedure can be found in P. W. Holland and R. E. Welsch, "Robust regression using iteratively reweighted least squares," *Comm. Statisi.*, vol. A6, pp. 813–827, 1977.

The appropriate selection of $\hat{b}_k$ from the above estimations is based on two tests, a subjective and an objective one in accordance with a preferred embodiment of the present invention. The music quality is subjectively evaluated against both the original and compressed/decompressed music pieces that were obtained by using either PM1 or PM2. For the objective measurements, the bit-allocation deviations from a corresponding MPEG implementation using either PM1 or PM2 are employed. The deviations are computed for sampled frames and the average deviation per frame is taken as an indication of the amount of digression from an implementation that uses the recommended psychoacoustic models.

Pulse code modulation (PCM) samples with 16-bit resolution of several different types of music that include rock and roll, classical violin, speech, piano, symphony orchestra, country and western and folk music were gathered. 1400 frames of information were obtained for Layer II and Layer I with PM1 and PM2 respectively. The pseudo-energy value for the ith frame and the jth subband was computed by adding the absolute values of the subband samples (36 in Layer II and 12 in Layer I) in the frame. The natural logarithm of that value is taken as $x_i(j)$. Two different estimations were performed; one using the technique of Boncelet and Dickinson, and the other using the AGSS package. If subjective evaluations suggested that the AGSS estimation be chosen, that would ultimately be decided as the proper value for $b_k$. Another important point is that at certain subbands, the prediction using a straightforward linear least squares proved to be better and, hence, it was decided to use the linear least square method for that. The coefficients given in the following section contain regression parameters that are a mixture from these three methods.

Table 2 provides a comparison between PM2 and a preferred embodiment of the present invention.

TABLE 2

| Subband No. | No. Bits PM2 | No. Bits Proposed | Deviation Average bits/frame |
|---|---|---|---|
| 1 | 23161 | 23035 | 0.242090 |
| 2 | 16361 | 16970 | 0.136139 |
| 3 | 13483 | 13782 | 0.123077 |
| 4 | 13853 | 13659 | 0.211030 |
| 5 | 12425 | 12550 | 0.149492 |
| 6 | 13240 | 13000 | 0.197097 |
| 7 | 12078 | 11998 | 0.169811 |
| 8 | 11769 | 11503 | 0.195356 |
| 9 | 11132 | 10725 | 0.161393 |
| 10 | 10755 | 10521 | 0.109434 |
| 11 | 10558 | 10451 | 0.079245 |
| 12 | 9999 | 10193 | 0.057765 |
| 13 | 9053 | 9198 | 0.109724 |
| 14 | 7168 | 7159 | 0.102467 |
| 15 | 5866 | 6076 | 0.123948 |
| 16 | 4110 | 4193 | 0.137881 |
| 17 | 1740 | 1559 | 0.182003 |
| 18 | 54 | 43 | 0.028157 |

No bits allocated for subbands 19–32 in both cases. Column 2 gives the subband number and Column 2 gives the number of bits allocated for the entire test sequence when Layer I with PM2 was applied. Column 3 gives the corresponding number of bits allocated for the proposed method with Layer I implementation. Finally, the measurement of the fidelity of the method when compared to PM2 is given in Column 4 by considering the average deviations in the allocated number of bits between PM2 and the proposed scheme. By looking at the number of subbands that were actually coded, the scheme also preserved the frequency content of the incoming data as well in comparison to PM2. The resulting bit streams from the present invention when compared to the corresponding originals were virtually indistinguishable by many listeners.

Figure 5:
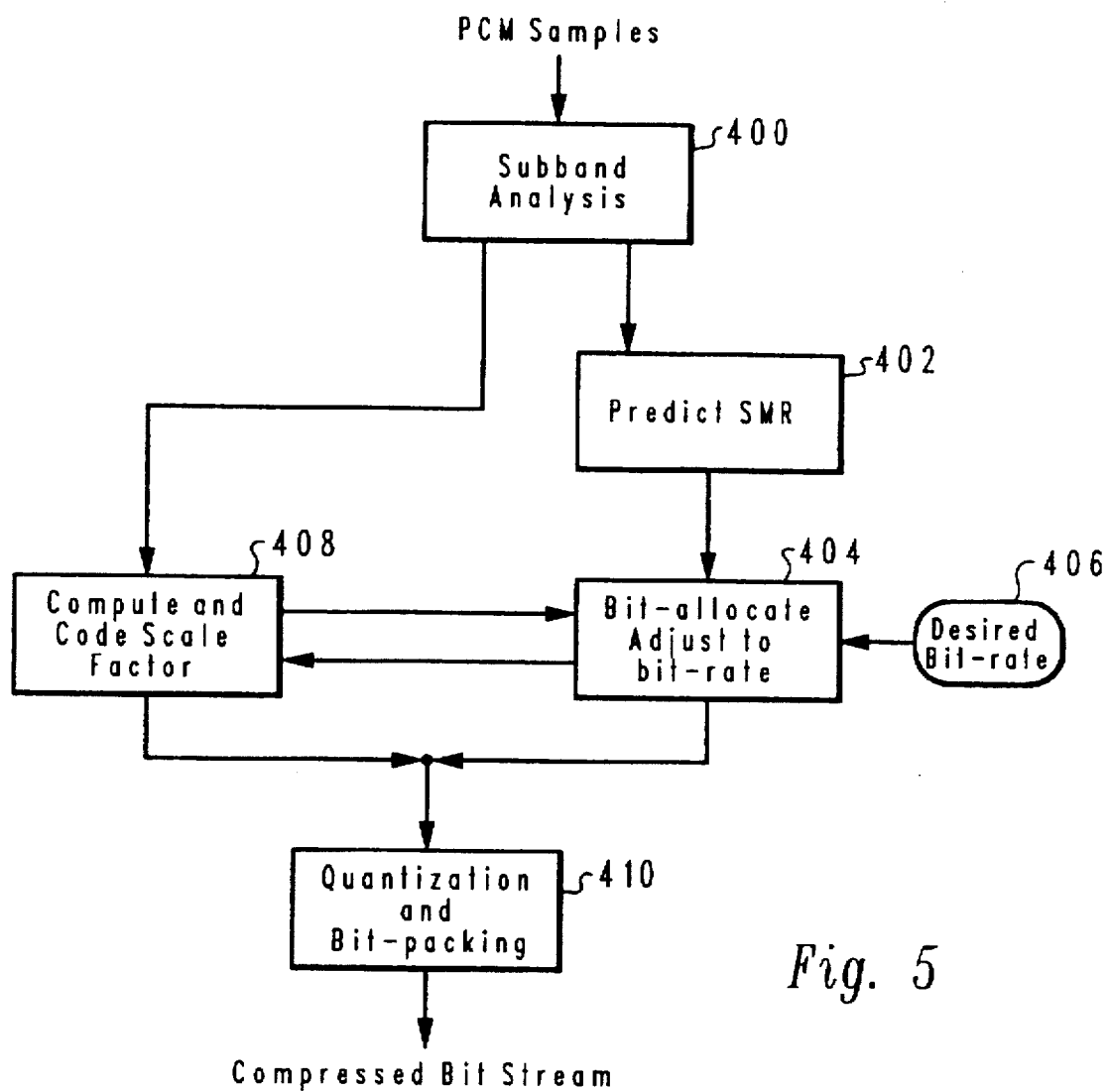
FIG. 5 depicts a high level flowchart of an audio encoding process in accordance with a preferred embodiment of the present invention.

Referring next to FIG. 5, a high level flowchart of a process for compressing PCM samples is depicted in accordance with a preferred embodiment of the present invention. Subband analysis is performed on the PCM samples to produce the desired subbands for each samples. Each subband may be produced by filtering the sample utilizing known filtering systems in accordance with a preferred embodiment of the present invention. Thereafter, SMR is predicted for a subband utilizing a model of relationships between energy values within each of the subbands and utilizing SMR values based on a predetermined psychoacoustic model, as illustrated in block 402.

Next, the predicted SMR is employed to determine a bit allocation for the sample, as depicted in block 404. A desired bit-rate also is considered in bit allocation, as illustrated in block 406. Scale factor coding is performed for each of the subbands in a PCM sample, as depicted in block 408. Quantization and bit packing is performed, as illustrated in block 410, utilizing the bit-allocation and scale factor from blocks 404 and 408. In accordance with a preferred embodiment of the present invention, the need for spectral analysis of PCM samples being compressed is eliminated.

Figure 6:
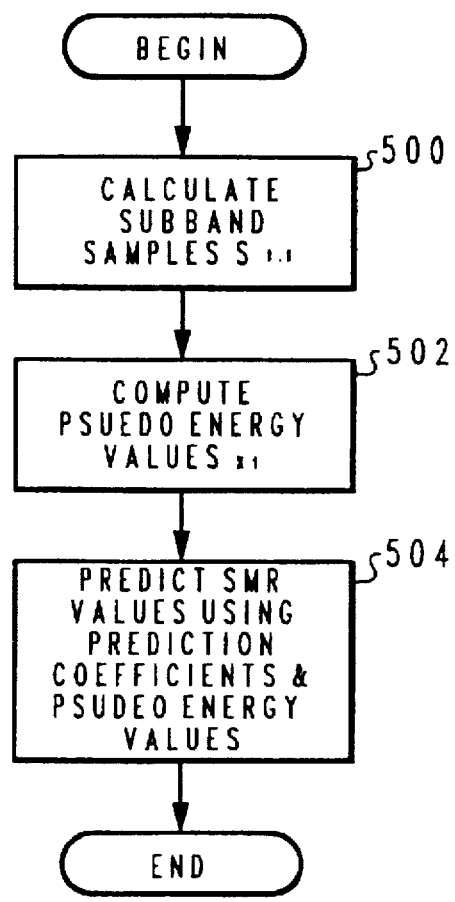
FIG. 6 is a flowchart of a process for predicting SMR values in accordance with a preferred embodiment of the present invention.

Referring now to FIG. 6, a flowchart of a process for predicting SMR values in block 402 of FIG. 5 is illustrated in accordance with a preferred embodiment of the present invention. For a particular frame the process computes the maximally decimated subband samples $s_{i,l}, i=1,2,\ldots,32$ and $l=1,2,\ldots,L$, as depicted in block 500, where i denotes the subband number, as depicted in block in accordance with a preferred embodiment of the present invention. L is 12 for Layer I and 36 for Layer II under MPEG standards.

Next, the process computes pseudo-energy values $$x_i = \ln\left(\sum_{l=1}^{L} |s_{i,l}|\right) \quad i=1,2,\ldots,32 \qquad \text{equation (5)}$$

as illustrated in block 502. Thereafter, The SMR values are predicted, as illustrated in block 504:

$$y_i = \sum_{j=1}^{32} \beta_{i,j} x_j + \beta_{i,33} \qquad \text{equation (6)}$$

where the $\beta_{i,j}$ values for Layers I and II are given in Table 3 and Table 4 respectively in the appendix for a 44.1 kHz input signal. The following pages disclose Table 3 and Table 4.

TABLE 3

| | Prediction Coefficients for Layer I: 44.1 kHz Audio | | | | | |
|---|---|---|---|---|---|---|
| Coefficient | Subband i = 1 | Subband i = 2 | Subband i = 3 | Subband i = 4 | Subband i = 5 | Subband i = 6 |
| $\beta_{i,1}$ | 1.4402 | −2.1590 | −0.3714 | −0.1201 | −0.1248 | 0.0247 |
| $\beta_{i,2}$ | 0.0079 | 2.5482 | −0.5392 | 0.0642 | 0.0968 | −0.1311 |
| $\beta_{i,3}$ | −0.4029 | −0.0546 | 2.2706 | −0.8904 | −0.2350 | 0.0845 |
| $\beta_{i,4}$ | −0.0931 | −0.3487 | −1.1577 | 2.3857 | −1.0164 | −0.2894 |
| $\beta_{i,5}$ | 0.7042 | 0.1272 | 0.3870 | −0.9340 | 3.1973 | −0.5607 |
| $\beta_{i,6}$ | −0.4697 | 0.1951 | 0.0789 | 0.0782 | −1.3077 | 2.8403 |

TABLE 3-continued

Prediction Coefficients for Layer I: 44.1 kHz Audio

| | | | | | | |
|---|---|---|---|---|---|---|
| $\beta_{i,7}$ | −0.1494 | −0.3954 | −0.1309 | 0.1125 | 0.1001 | −1.2489 |
| $\beta_{i,8}$ | 0.0830 | −0.0573 | −0.0546 | −0.1734 | −0.3409 | −0.0021 |
| $\beta_{i,9}$ | 0.1018 | 0.0010 | 0.0551 | −0.1679 | 0.2942 | −0.1181 |
| $\beta_{i,10}$ | 0.1451 | 0.2079 | −0.1036 | 0.3687 | −0.4838 | −0.1605 |
| $\beta_{i,11}$ | −0.1750 | −0.1449 | −0.0302 | −0.4955 | −0.2869 | −0.1137 |
| $\beta_{i,12}$ | 0.3343 | 0.1909 | 0.0280 | 0.2934 | 0.4110 | 0.2922 |
| $\beta_{i,13}$ | 0.0504 | 0.3325 | 0.0372 | 0.1101 | −0.1305 | 0.0001 |
| $\beta_{i,14}$ | −0.0752 | 0.4141 | 0.0833 | −0.2733 | 0.3259 | −0.0650 |
| $\beta_{i,15}$ | −0.0677 | 0.1239 | 0.2914 | 0.0569 | −0.4656 | −0.2353 |
| $\beta_{i,16}$ | −0.2566 | −0.1025 | −0.4918 | −0.3814 | 0.1918 | −0.0846 |
| $\beta_{i,17}$ | 0.2621 | −0.0394 | 0.2767 | 0.3012 | −0.1217 | −0.0067 |
| $\beta_{i,18}$ | −0.0996 | −0.2749 | −0.3724 | 0.1307 | 0.1145 | 0.3957 |
| $\beta_{i,19}$ | 0.0478 | −0.3420 | −0.0790 | −0.5125 | 0.0655 | −0.2317 |
| $\beta_{i,20}$ | −0.7799 | −0.1030 | −0.4152 | 0.0816 | 0.3425 | −0.0200 |
| $\beta_{i,21}$ | 0.4170 | 0.4592 | 0.5045 | 0.2857 | −0.0034 | 0.1357 |
| $\beta_{i,22}$ | −0.0631 | −0.3806 | −0.0075 | −0.0607 | −0.1935 | −0.0840 |
| $\beta_{i,23}$ | −0.5200 | 0.5564 | −0.2310 | −0.3325 | −0.1216 | 0.0198 |
| $\beta_{i,24}$ | 0.4502 | −0.4233 | −0.1495 | 0.1735 | −0.1641 | −0.3094 |
| $\beta_{i,25}$ | −0.6128 | 0.5906 | 0.0812 | 0.0431 | −0.3598 | 0.2504 |
| $\beta_{i,26}$ | 0.7079 | −0.2102 | −0.0265 | −0.2588 | 0.2794 | 0.0157 |
| $\beta_{i,27}$ | 0.0998 | −0.0353 | 0.0447 | 0.2808 | 0.0366 | 0.0044 |
| $\beta_{i,28}$ | 0.0350 | 0.0716 | 0.1670 | −0.2473 | 0.2600 | −0.1089 |
| $\beta_{i,29}$ | 0.8125 | −0.0453 | 0.0857 | 0.4027 | −0.3471 | −0.3292 |
| $\beta_{i,30}$ | −0.4829 | −0.4381 | −0.3011 | 0.0477 | 0.1541 | 0.0753 |
| $\beta_{i,31}$ | −0.6959 | −0.1495 | −0.2256 | −0.2769 | 0.2175 | −0.2248 |
| $\beta_{i,32}$ | −0.3923 | −0.1221 | 0.2634 | −0.0693 | −0.3645 | 0.2874 |

| Coefficient | Subband $i = 7$ | Subband $i = 8$ | Subband $i = 9$ | Subband $i = 10$ | Subband $i = 11$ | Subband $i = 12$ |
|---|---|---|---|---|---|---|
| $\beta_{i,1}$ | 0.0794 | 0.4969 | 0.7402 | 0.8565 | 1.2528 | 1.4764 |
| $\beta_{i,2}$ | 0.1396 | 0.2063 | 0.4788 | 0.6139 | 0.7511 | 0.7061 |
| $\beta_{i,3}$ | 0.0559 | 0.0233 | −0.1671 | −0.1006 | −0.4007 | −0.3029 |
| $\beta_{i,4}$ | −0.0703 | 0.1421 | 0.2772 | 0.0057 | 0.2320 | 0.1295 |
| $\beta_{i,5}$ | −0.2863 | −0.1473 | −0.1828 | −0.1568 | −0.2590 | −0.1748 |
| $\beta_{i,6}$ | −0.4552 | −0.1761 | 0.0568 | 0.3877 | 0.5735 | 0.4953 |
| $\beta_{i,7}$ | 2.4589 | −0.7183 | −0.3406 | −0.1793 | −0.2826 | −0.3261 |
| $\beta_{i,8}$ | −0.9405 | 2.8557 | −0.3907 | 0.0356 | 0.1928 | 0.3032 |
| $\beta_{i,9}$ | −0.5450 | −1.1658 | 2.9290 | −0.3219 | −0.1170 | 0.1224 |
| $\beta_{i,10}$ | 0.1682 | 0.2279 | −0.4035 | 3.4761 | −0.2862 | 0.0133 |
| $\beta_{i,11}$ | −0.0496 | −0.1232 | −0.2442 | −0.7467 | 3.4082 | −0.2352 |
| $\beta_{i,12}$ | 0.3000 | 0.4774 | 0.7610 | 0.6376 | 0.2309 | 4.6947 |
| $\beta_{i,13}$ | 0.0166 | −0.1397 | 0.1325 | 0.0461 | −0.0258 | −0.6025 |
| $\beta_{i,14}$ | −0.0429 | 0.2699 | −0.1968 | −0.2133 | −0.1758 | −0.3726 |
| $\beta_{i,15}$ | −0.2813 | −0.2446 | −0.5360 | −0.1836 | −0.3837 | −0.0148 |
| $\beta_{i,16}$ | 0.0547 | 0.0368 | 0.0777 | −0.1891 | −0.0926 | −0.0755 |
| $\beta_{i,17}$ | −0.0007 | −0.2075 | 0.0729 | 0.1446 | 0.4162 | 0.5943 |
| $\beta_{i,18}$ | 0.1760 | 0.3581 | 0.2593 | 0.1862 | −0.0604 | −0.2849 |
| $\beta_{i,19}$ | −0.1467 | −0.3998 | −0.2673 | −0.2789 | −0.0442 | −0.1403 |
| $\beta_{i,20}$ | −0.0419 | −0.0133 | 0.4383 | 0.2668 | 0.1794 | 0.1196 |
| $\beta_{i,21}$ | 0.0782 | −0.1585 | 0.0025 | 0.1151 | −0.1358 | −0.2083 |
| $\beta_{i,22}$ | 0.1991 | 0.1762 | −0.0660 | −0.2421 | −0.1732 | −0.0190 |
| $\beta_{i,23}$ | −0.2446 | −0.3319 | −0.3454 | −0.3570 | −0.1435 | −0.3030 |
| $\beta_{i,24}$ | −0.1390 | 0.4964 | −0.1770 | 0.2782 | −0.0918 | 0.1912 |
| $\beta_{i,25}$ | 0.0356 | 0.0838 | −0.0792 | 0.0591 | 0.0178 | 0.1708 |
| $\beta_{i,26}$ | 0.0426 | 0.0130 | 0.3630 | 0.0583 | 0.2963 | 0.0787 |
| $\beta_{i,27}$ | 0.2995 | −0.3125 | −0.1349 | −0.0424 | 0.3643 | 0.1547 |
| $\beta_{i,28}$ | −0.3915 | −0.1807 | −0.3915 | −0.4343 | −0.4429 | −0.5636 |
| $\beta_{i,29}$ | −0.2177 | −0.4140 | −0.8172 | −0.9126 | −1.0495 | −1.2503 |
| $\beta_{i,30}$ | −0.1130 | −0.4065 | −0.6923 | −1.0573 | −1.2473 | −1.2913 |
| $\beta_{i,31}$ | 0.0910 | −0.0419 | 0.1374 | −0.0249 | 0.0155 | −0.4843 |
| $\beta_{i,32}$ | −0.0185 | 0.0189 | −0.1524 | −0.1982 | −0.4246 | −0.3170 |

| Coefficient | Subband $i = 13$ | Subband $i = 14$ | Subband $i = 15$ | Subband $i = 16$ | Subband $i = 17$ | Subband $i = 18$ |
|---|---|---|---|---|---|---|
| $\beta_{i,1}$ | 1.6427 | 2.2345 | 2.7743 | 3.0673 | 3.3106 | 3.4211 |
| $\beta_{i,2}$ | 0.9331 | 0.0862 | 0.9315 | 0.8681 | 0.8190 | 0.9363 |
| $\beta_{i,3}$ | −0.4010 | −0.2814 | −0.3328 | −0.2191 | −0.2201 | −0.4104 |
| $\beta_{i,4}$ | 0.4397 | 0.3848 | 0.3181 | 0.1319 | 0.2095 | 0.1741 |
| $\beta_{i,5}$ | −0.3925 | −0.2007 | −0.5222 | −0.3876 | −0.4155 | −0.4155 |
| $\beta_{i,6}$ | 0.5534 | 0.2752 | 0.1196 | −0.0569 | −0.1198 | 0.0055 |
| $\beta_{i,7}$ | −0.3332 | −0.5189 | −0.2118 | −0.1143 | −0.3111 | −0.0911 |
| $\beta_{i,8}$ | 0.1933 | 0.3575 | 0.3965 | 0.4703 | 0.6854 | 0.5060 |
| $\beta_{i,9}$ | −0.2924 | −0.1487 | 0.2614 | 0.3972 | 0.4630 | 0.4609 |
| $\beta_{i,10}$ | 0.3242 | −0.1519 | −0.3219 | −0.4567 | −0.5197 | −0.6080 |
| $\beta_{i,11}$ | 0.2163 | 0.4296 | 0.2239 | 0.2382 | 0.0432 | 0.1408 |

TABLE 3-continued

Prediction Coefficients for Layer I: 44.1 kHz Audio

| | | | | | | |
|---|---|---|---|---|---|---|
| $\beta_{i,12}$ | 0.6106 | 0.8888 | 0.6543 | 0.0569 | 0.0488 | −0.3417 |
| $\beta_{i,13}$ | 3.5997 | −0.2264 | −0.4051 | −0.0200 | −0.0128 | −0.1672 |
| $\beta_{i,14}$ | 0.0111 | 4.1680 | 0.2448 | 0.0445 | −0.0787 | 0.1265 |
| $\beta_{i,15}$ | −0.5254 | −0.2417 | 3.7860 | −0.0395 | 0.0171 | 0.1667 |
| $\beta_{i,16}$ | −0.0998 | −0.2652 | 0.0183 | 3.9253 | 0.7802 | 0.1237 |
| $\beta_{i,17}$ | 0.7032 | 0.3878 | 0.4313 | 0.9662 | 4.3259 | 1.1715 |
| $\beta_{i,18}$ | −0.2175 | −0.4849 | −0.4111 | −0.1676 | 0.1651 | 3.4882 |
| $\beta_{i,19}$ | −0.0103 | 0.3853 | 0.1210 | 0.2387 | 0.0496 | 0.2679 |
| $\beta_{i,20}$ | 0.2718 | 0.5935 | 0.5518 | 0.1825 | 0.1256 | 0.2563 |
| $\beta_{i,21}$ | −0.3931 | −0.8651 | −0.1774 | −0.2891 | −0.0182 | −0.1696 |
| $\beta_{i,22}$ | 0.2303 | 0.5518 | 0.3402 | 0.4406 | 0.2034 | 0.5667 |
| $\beta_{i,23}$ | 0.0726 | 0.2030 | −0.1205 | 0.2049 | 0.3942 | 0.5181 |
| $\beta_{i,24}$ | −0.1388 | 0.1089 | 0.0825 | −0.2341 | −0.6947 | −0.8749 |
| $\beta_{i,25}$ | 0.4155 | 0.2557 | 0.2347 | −0.0821 | 0.0523 | 0.0668 |
| $\beta_{i,26}$ | 0.1257 | −0.0161 | 0.3702 | 0.4175 | 0.5463 | 0.4733 |
| $\beta_{i,27}$ | 0.3318 | 0.3625 | 0.3448 | 0.0568 | 0.0961 | 0.1771 |
| $\beta_{i,28}$ | −0.6866 | −0.4377 | −0.3466 | 0.1122 | 0.0537 | 0.1370 |
| $\beta_{i,29}$ | −1.3947 | −2.0386 | −1.7201 | −1.4993 | −1.4679 | −0.6975 |
| $\beta_{i,30}$ | −1.2268 | −0.6072 | −0.6733 | −0.7032 | −0.5449 | −0.1244 |
| $\beta_{i,31}$ | −0.5522 | −0.8195 | −0.9923 | −1.3840 | −1.0802 | −1.1340 |
| $\beta_{i,32}$ | −1.1676 | −1.6180 | −1.8337 | −1.5214 | −1.6579 | −1.2908 |

| Coefficient | Subband i = 19 | Subband i = 20 | Subband i = 21 | Subband i = 22 | Subband i = 23 | Subband i = 24 |
|---|---|---|---|---|---|---|
| $\beta_{i,1}$ | 3.8451 | 3.8163 | 3.9186 | 3.8504 | 3.5291 | 4.0654 |
| $\beta_{i,2}$ | 0.8317 | 0.9226 | 0.9234 | 0.8584 | 0.8317 | 0.8953 |
| $\beta_{i,3}$ | −0.3182 | −0.2451 | −0.1646 | 0.0058 | −0.2558 | −0.1303 |
| $\beta_{i,4}$ | 0.1111 | 0.1024 | 0.0530 | 0.0871 | 0.2980 | 0.2800 |
| $\beta_{i,5}$ | −0.3147 | −0.2223 | −0.4677 | −0.4332 | −0.2547 | −0.3451 |
| $\beta_{i,6}$ | 0.0527 | −0.2141 | −0.0293 | −0.1233 | −0.1622 | −0.1537 |
| $\beta_{i,7}$ | −0.1125 | 0.0217 | 0.0491 | 0.1067 | 0.2222 | 0.1841 |
| $\beta_{i,8}$ | 0.3332 | 0.1561 | 0.0713 | 0.0184 | 0.2422 | 0.1595 |
| $\beta_{i,9}$ | 0.5389 | 0.8049 | 0.7997 | 0.9188 | 0.5395 | 0.6928 |
| $\beta_{i,10}$ | −0.3789 | −0.4194 | −0.4809 | −0.6953 | −0.6156 | −0.5852 |
| $\beta_{i,11}$ | 0.1424 | 0.1551 | 0.1208 | 0.0717 | −0.0813 | 0.0556 |
| $\beta_{i,12}$ | −0.1196 | −0.3050 | −0.0549 | 0.2779 | 0.0647 | 0.0694 |
| $\beta_{i,13}$ | −0.2901 | −0.1739 | −0.2967 | −0.2739 | −0.1546 | −0.1406 |
| $\beta_{i,14}$ | −0.0947 | −0.1738 | −0.0572 | 0.2194 | 0.1336 | 0.1293 |
| $\beta_{i,15}$ | 0.1604 | 0.0681 | 0.1379 | −0.0017 | 0.2006 | 0.3046 |
| $\beta_{i,16}$ | 0.1748 | 0.2071 | 0.0663 | 0.1915 | 0.2225 | 0.0171 |
| $\beta_{i,17}$ | 1.1738 | 0.7260 | 0.6736 | 0.6287 | 0.3458 | 0.7125 |
| $\beta_{i,18}$ | 0.2622 | 0.3160 | −0.0351 | −0.0503 | 0.0696 | −0.1269 |
| $\beta_{i,19}$ | 2.9223 | 0.4731 | 0.1690 | −0.3473 | −0.2440 | −0.4857 |
| $\beta_{i,20}$ | 0.4823 | 3.0266 | 0.2751 | 0.2137 | −0.1403 | −0.0719 |
| $\beta_{i,21}$ | −0.0785 | 0.1403 | 3.0261 | 0.1010 | 0.2123 | −0.3017 |
| $\beta_{i,22}$ | 0.2517 | 0.3661 | 0.7376 | 3.0032 | 0.6174 | 0.6540 |
| $\beta_{i,23}$ | 0.4532 | 0.7925 | 0.6817 | 0.8399 | 4.0332 | 0.8672 |
| $\beta_{i,24}$ | −0.9028 | −0.4446 | −0.4855 | −0.1822 | −0.4023 | 2.0690 |
| $\beta_{i,25}$ | −0.0076 | −0.2614 | −0.2075 | −0.0614 | −0.2193 | 0.0973 |
| $\beta_{i,26}$ | 0.5996 | 0.5954 | 0.7975 | 0.9997 | 0.9242 | 1.0803 |
| $\beta_{i,27}$ | 0.2645 | 0.1342 | 0.1839 | −0.0645 | 0.1276 | 0.0558 |
| $\beta_{i,28}$ | 0.1742 | −0.0840 | 0.0450 | 0.2803 | 0.3780 | 0.4196 |
| $\beta_{i,29}$ | −1.5689 | −1.9058 | −1.8861 | −1.6272 | −1.1342 | −1.6433 |
| $\beta_{i,30}$ | 0.1720 | 0.4200 | 0.4114 | 0.3630 | 0.2925 | 0.3157 |
| $\beta_{i,31}$ | −0.8155 | −0.6029 | −0.4246 | −0.0525 | 0.0912 | −0.1232 |
| $\beta_{i,32}$ | −1.1990 | −0.6412 | −0.1916 | 0.2522 | 0.2805 | 0.7629 |

| Coefficient | Subband i = 25 | Subband i = 26 | Subband i = 27 | Subband i = 28 | Subband i = 29 | Subband i = 30 |
|---|---|---|---|---|---|---|
| $\beta_{i,1}$ | 4.3079 | 4.5598 | 4.8805 | 4.8804 | 5.0826 | 5.2083 |
| $\beta_{i,2}$ | 1.0467 | 1.0263 | 1.0357 | 1.0434 | 1.0021 | 1.0216 |
| $\beta_{i,3}$ | −0.1249 | −0.0667 | −0.0396 | 0.0147 | 0.0859 | 0.0520 |
| $\beta_{i,4}$ | 0.1213 | 0.1202 | 0.1275 | 0.2093 | 0.3157 | 0.3937 |
| $\beta_{i,5}$ | −0.4503 | −0.3550 | −0.3858 | −0.4107 | −0.5739 | −0.6168 |
| $\beta_{i,6}$ | 0.0271 | −0.0544 | −0.0255 | −0.1296 | −0.1168 | −0.1294 |
| $\beta_{i,7}$ | 0.3418 | 0.4467 | 0.4356 | 0.4538 | 0.5110 | 0.6005 |
| $\beta_{i,8}$ | 0.0210 | −0.0872 | −0.0153 | −0.0544 | −0.2224 | −0.1881 |
| $\beta_{i,9}$ | 0.5640 | 0.6808 | 0.6860 | 0.6977 | 0.8163 | 0.9754 |
| $\beta_{i,10}$ | −0.6983 | −0.7488 | −1.0000 | −0.9273 | −0.8570 | −1.0441 |
| $\beta_{i,11}$ | 0.2370 | 0.3835 | 0.6244 | 0.7149 | 0.7696 | 0.7568 |
| $\beta_{i,12}$ | 0.2139 | 0.1608 | 0.4249 | 0.3298 | 0.4766 | 0.5485 |
| $\beta_{i,13}$ | −0.1163 | −0.2158 | −0.3345 | −0.3548 | −0.4836 | −0.6545 |
| $\beta_{i,14}$ | 0.1378 | −0.0476 | −0.0107 | −0.0169 | −0.0154 | 0.0186 |
| $\beta_{i,15}$ | 0.1128 | 0.2093 | 0.2430 | 0.2438 | 0.3546 | 0.4421 |
| $\beta_{i,16}$ | 0.0222 | 0.0533 | −0.1263 | 0.0284 | 0.0692 | 0.0040 |

TABLE 3-continued

Prediction Coefficients for Layer I: 44.1 kHz Audio

| | | | | | | |
|---|---|---|---|---|---|---|
| $\beta_{i,17}$ | 0.8308 | 0.8386 | 0.8084 | 0.7499 | 0.7220 | 0.6629 |
| $\beta_{i,18}$ | −0.1457 | −0.3400 | −0.3005 | −0.2467 | −0.4024 | −0.3496 |
| $\beta_{i,19}$ | −0.4155 | −0.2518 | −0.1921 | −0.1422 | −0.1138 | −0.2497 |
| $\beta_{i,20}$ | −0.1452 | −0.0899 | −0.2509 | −0.1384 | −0.2656 | −0.1466 |
| $\beta_{i,21}$ | −0.3965 | −0.4477 | −0.5137 | −0.6676 | −0.5856 | −0.5809 |
| $\beta_{i,22}$ | 0.5647 | 0.4364 | 0.6666 | 0.5522 | 0.4106 | 0.6044 |
| $\beta_{i,23}$ | 0.8640 | 0.8861 | 0.7571 | 0.7241 | 0.5965 | 0.6740 |
| $\beta_{i,24}$ | −0.2930 | −0.5127 | −0.6569 | −0.7791 | −0.9091 | −0.9204 |
| $\beta_{i,25}$ | 1.9127 | 0.0278 | −0.3120 | −0.4418 | −0.3748 | −0.6183 |
| $\beta_{i,26}$ | 1.2168 | 2.8719 | 0.7716 | 0.7201 | 0.8387 | 0.8216 |
| $\beta_{i,27}$ | −0.1742 | −0.1571 | 1.6211 | −0.0292 | −0.4286 | −0.4601 |
| $\beta_{i,28}$ | 0.7224 | 0.5655 | 0.8643 | 2.2273 | 0.6998 | 0.5978 |
| $\beta_{i,29}$ | −1.2241 | −1.1736 | −1.1706 | −1.0487 | 0.6257 | −0.6827 |
| $\beta_{i,30}$ | 0.5833 | 1.1505 | 1.0181 | 1.1363 | 1.4494 | 2.4980 |
| $\beta_{i,31}$ | −0.1160 | −0.1216 | 0.1950 | 0.3723 | 0.5335 | 0.5793 |
| $\beta_{i,32}$ | 0.4159 | 0.3040 | 0.4053 | 0.4981 | 0.2801 | 0.5592 |

| Coefficient | Subband i = 31 | Subband i = 32 | Constant Term $\beta_{k,33}$ k = 1,2, . . . ,32 |
|---|---|---|---|
| $\beta_{i,1}$ | 5.3684 | 5.3391 | 21.5640 |
| $\beta_{i,2}$ | 0.9453 | 0.9680 | 13.9750 |
| $\beta_{i,3}$ | 0.1195 | 0.1816 | 7.6866 |
| $\beta_{i,4}$ | 0.3259 | 0.3250 | 6.8826 |
| $\beta_{i,5}$ | −0.5176 | −0.5910 | 6.3966 |
| $\beta_{i,6}$ | −0.0184 | −0.0030 | 6.1641 |
| $\beta_{i,7}$ | 0.5802 | 0.5005 | 5.2070 |
| $\beta_{i,8}$ | −0.1784 | −0.1642 | 4.2241 |
| $\beta_{i,9}$ | 0.9576 | 1.0003 | 2.7574 |
| $\beta_{i,10}$ | −1.1590 | −0.9857 | 2.3890 |
| $\beta_{i,11}$ | 0.7757 | 0.6357 | 1.2362 |
| $\beta_{i,12}$ | 0.4857 | 0.4902 | 1.3702 |
| $\beta_{i,13}$ | −0.6296 | −0.5374 | 1.2366 |
| $\beta_{i,14}$ | 0.0667 | −0.0291 | 0.3416 |
| $\beta_{i,15}$ | 0.4718 | 0.4429 | 1.2971 |
| $\beta_{i,16}$ | 0.1038 | 0.0295 | 1.0463 |
| $\beta_{i,17}$ | 0.6533 | 0.6607 | 1.5848 |
| $\beta_{i,18}$ | −0.3497 | −0.2793 | 2.6275 |
| $\beta_{i,19}$ | −0.3322 | −0.2662 | 3.1779 |
| $\beta_{i,20}$ | −0.2097 | −0.2693 | 3.9467 |
| $\beta_{i,21}$ | −0.6423 | −0.4982 | 3.9231 |
| $\beta_{i,22}$ | 0.5316 | 0.3872 | 4.6391 |
| $\beta_{i,23}$ | 0.7056 | 0.7800 | −1.7057 |
| $\beta_{i,24}$ | −0.7183 | −0.7389 | −10.0903 |
| $\beta_{i,25}$ | −0.3562 | −0.3527 | −10.2050 |
| $\beta_{i,26}$ | 0.4432 | 0.5482 | −11.1570 |
| $\beta_{i,27}$ | −0.3881 | −0.5485 | −11.6970 |
| $\beta_{i,28}$ | 0.6956 | 0.6386 | −12.2220 |
| $\beta_{i,29}$ | −0.7530 | −0.7639 | −27.5050 |
| $\beta_{i,30}$ | 1.1031 | 1.1932 | −40.0740 |
| $\beta_{i,31}$ | 1.7983 | 0.6223 | −40.4300 |
| $\beta_{i,32}$ | 0.5897 | 1.7744 | −40.2560 |

TABLE 4

Prediction Coefficients for Layer II: 44.1 kHz Audio

| Coefficient | Subband i = 1 | Subband i = 2 | Subband i = 3 | Subband i = 4 | Subband i = 5 | Subband i = 6 |
|---|---|---|---|---|---|---|
| $\beta_{i,1}$ | 2.5329 | −0.3939 | −0.0520 | −0.0246 | −0.2559 | 0.5237 |
| $\beta_{i,2}$ | 0.3435 | 2.8841 | −0.3113 | −0.2361 | −0.0807 | −0.0068 |
| $\beta_{i,3}$ | −0.0070 | −0.7536 | 2.2972 | −0.2517 | −0.2962 | −0.3941 |
| $\beta_{i,4}$ | 0.1946 | 0.1713 | −0.1317 | 2.4747 | −0.5923 | −0.2818 |
| $\beta_{i,5}$ | −0.1394 | 0.1576 | 0.5933 | 0.5318 | 3.2455 | −0.2436 |
| $\beta_{i,6}$ | 0.6764 | −0.1985 | 0.1866 | 0.4997 | −0.2623 | 3.2766 |
| $\beta_{i,7}$ | −0.5469 | 0.3602 | −0.4321 | −0.1235 | 0.3401 | −0.7476 |
| $\beta_{i,8}$ | −0.7019 | −0.4780 | −0.2438 | −0.0600 | −0.8279 | 0.0312 |
| $\beta_{i,9}$ | 0.0765 | 0.0310 | 0.0626 | 0.2939 | 0.4158 | 0.0443 |
| $\beta_{i,10}$ | −0.3388 | −0.3723 | 0.0461 | 0.2410 | 0.1553 | −0.2841 |
| $\beta_{i,11}$ | −0.2491 | 0.0758 | −0.0377 | −0.6650 | −0.3148 | −0.2874 |
| $\beta_{i,12}$ | 0.2038 | 0.0734 | 0.2375 | −0.2211 | −0.2311 | −0.0817 |
| $\beta_{i,13}$ | −0.2102 | 0.3434 | 0.0262 | −0.0458 | 1.0099 | −0.0662 |
| $\beta_{i,14}$ | 1.5422 | 0.3384 | 0.3382 | −0.1577 | −0.1805 | −0.2833 |

TABLE 4-continued

Prediction Coefficients for Layer II: 44.1 kHz Audio

| | | | | | | |
|---|---|---|---|---|---|---|
| $\beta_{i,15}$ | −1.0587 | −0.7274 | −0.1300 | −0.2552 | −0.7809 | 0.2848 |
| $\beta_{i,16}$ | −0.2100 | 0.1390 | −0.5580 | 0.4003 | −0.2479 | 0.4259 |
| $\beta_{i,17}$ | −0.3920 | −0.0701 | −0.1087 | −0.1831 | −0.1681 | −0.3417 |
| $\beta_{i,18}$ | −0.9268 | −0.3241 | 0.6587 | −0.0182 | −0.6896 | 0.6910 |
| $\beta_{i,19}$ | 0.5812 | 1.0838 | 0.2259 | −0.3903 | 0.5135 | −0.5347 |
| $\beta_{i,20}$ | 0.6191 | −0.4804 | −0.0682 | −0.5682 | −0.3826 | −0.7640 |
| $\beta_{i,21}$ | 0.6698 | 0.2659 | 0.2141 | 0.8130 | 0.2298 | −0.6954 |
| $\beta_{i,22}$ | −0.2458 | 0.2908 | 0.2758 | 0.2234 | 0.3322 | 0.6123 |
| $\beta_{i,23}$ | −0.8509 | −1.3416 | −0.3245 | −0.6300 | 0.0163 | −0.3453 |
| $\beta_{i,24}$ | 0.7007 | −0.5843 | −0.7266 | −0.8189 | −0.1402 | 0.6505 |
| $\beta_{i,25}$ | 0.9783 | 0.3227 | 0.3020 | 0.4810 | 0.2310 | −0.2127 |
| $\beta_{i,26}$ | −0.0054 | 0.6926 | −0.2134 | −0.0262 | −0.0272 | 0.3560 |
| $\beta_{i,27}$ | 0.7500 | −0.2577 | 0.3175 | −0.4975 | 0.1049 | −1.5066 |
| $\beta_{i,28}$ | −1.1742 | 0.6216 | 1.0195 | 1.3709 | −0.4434 | 0.3508 |
| $\beta_{i,29}$ | 1.7564 | −0.8654 | −0.1511 | −0.5030 | 0.2037 | 0.6809 |
| $\beta_{i,30}$ | 2.2156 | 0.0880 | −0.4663 | 0.6194 | 2.0118 | 1.5760 |
| $\beta_{i,31}$ | −1.0567 | 0.2385 | −0.0542 | 0.0108 | −0.0963 | −0.4039 |
| $\beta_{i,32}$ | −0.5275 | 1.4458 | 0.7706 | 0.6045 | 0.2591 | 0.0243 |

| Coefficient | Subband $i = 7$ | Subband $i = 8$ | Subband $i = 9$ | Subband $i = 10$ | Subband $i = 11$ | Subband $i = 12$ |
|---|---|---|---|---|---|---|
| $\beta_{i,1}$ | −0.1824 | −0.1360 | −0.0425 | −0.5062 | −0.9816 | −0.5455 |
| $\beta_{i,2}$ | −0.0190 | 0.1122 | 0.0685 | −0.0646 | −0.1243 | −0.1160 |
| $\beta_{i,3}$ | −0.2589 | −0.0339 | −0.0637 | 0.2969 | 0.5761 | 0.3792 |
| $\beta_{i,4}$ | 0.0807 | 0.1511 | 0.0392 | −0.2576 | −0.2311 | −0.3788 |
| $\beta_{i,5}$ | −0.1283 | −0.1327 | −0.7620 | −0.3741 | −0.2619 | −0.5498 |
| $\beta_{i,6}$ | −0.2530 | −0.1010 | 0.7593 | 0.6979 | 0.7606 | 0.4763 |
| $\beta_{i,7}$ | 3.3435 | −0.3912 | 0.4939 | 0.2123 | −0.0042 | 0.3365 |
| $\beta_{i,8}$ | −0.7775 | 3.0918 | −1.1204 | −0.2537 | 0.0840 | 0.1303 |
| $\beta_{i,9}$ | −0.2646 | −0.1770 | 3.5398 | −0.7539 | 0.0734 | 0.7007 |
| $\beta_{i,10}$ | −0.0857 | −0.2120 | −0.0364 | 3.9356 | −0.8107 | −0.4019 |
| $\beta_{i,11}$ | −0.7722 | 0.3270 | −0.1887 | −0.2577 | 4.4158 | −0.4207 |
| $\beta_{i,12}$ | −0.0649 | −0.1630 | 0.5830 | −0.1799 | 0.0665 | 4.4651 |
| $\beta_{i,13}$ | 0.3046 | 0.1068 | −0.9621 | −0.1201 | −1.1846 | −1.0365 |
| $\beta_{i,14}$ | −0.9666 | −0.6103 | 0.3226 | 1.0990 | 0.6738 | 0.7554 |
| $\beta_{i,15}$ | 0.2494 | −0.2333 | −0.3157 | −0.0194 | −0.5451 | −0.4217 |
| $\beta_{i,16}$ | 1.1945 | 0.0342 | 0.0326 | −0.6707 | 0.4126 | 0.2691 |
| $\beta_{i,17}$ | −0.0433 | −0.1676 | −0.5348 | −0.4195 | 0.2576 | −0.4599 |
| $\beta_{i,18}$ | 0.3478 | 0.7078 | 0.2245 | −0.4449 | −0.8906 | −0.3599 |
| $\beta_{i,19}$ | −0.9617 | −0.7649 | −0.0669 | −0.0695 | −0.0212 | 0.3577 |
| $\beta_{i,20}$ | −0.0059 | −0.0828 | −0.3712 | −0.0878 | −0.7387 | −0.7402 |
| $\beta_{i,21}$ | −0.0967 | −0.1140 | 1.1173 | 0.8290 | 0.5817 | 0.9634 |
| $\beta_{i,22}$ | 0.3719 | 0.5055 | 0.5311 | −0.3660 | 0.4489 | −0.5321 |
| $\beta_{i,23}$ | −0.3565 | −0.9895 | −1.1125 | −0.8393 | −1.8695 | −1.1416 |
| $\beta_{i,24}$ | −0.5229 | 0.5112 | −0.0557 | −0.1350 | 0.6759 | −0.0292 |
| $\beta_{i,25}$ | 1.0829 | 0.5214 | 0.5337 | −0.2699 | −0.1866 | −0.4794 |
| $\beta_{i,26}$ | −0.5729 | −0.5902 | 0.4554 | 0.8272 | −0.3796 | 0.1503 |
| $\beta_{i,27}$ | −0.9342 | −0.7938 | — | −0.4551 | 0.0177 | 0.5692 |
| $\beta_{i,28}$ | 0.7160 | 0.4915 | 0.9912 | −0.2644 | −0.2398 | −0.9286 |
| $\beta_{i,29}$ | −0.6014 | −0.4727 | 0.2091 | −0.6446 | 0.1130 | −0.4630 |
| $\beta_{i,30}$ | 2.1958 | 1.6685 | −0.7886 | −0.2091 | −0.0464 | 0.2588 |
| $\beta_{i,31}$ | −0.6893 | 0.9782 | 0.0102 | 0.4440 | 0.3712 | 0.0577 |
| $\beta_{i,32}$ | −0.0689 | −0.9841 | 0.3505 −0.9659 | −1.2798 | −0.7737 | −1.4787 |

| Coefficient | Subband $i = 13$ | Subband $i = 14$ | Subband $i = 15$ | Subband $i = 16$ | Subband $i = 17$ | Subband $i = 18$ |
|---|---|---|---|---|---|---|
| $\beta_{i,1}$ | −0.1445 | 0.0001 | −0.4740 | −0.1630 | −0.1056 | 0.0538 |
| $\beta_{i,2}$ | 0.1140 | 0.2163 | 0.1235 | 0.3498 | −0.1939 | 0.1823 |
| $\beta_{i,3}$ | 0.3062 | 0.6339 | 0.8386 | 0.2377 | 0.9282 | −0.0668 |
| $\beta_{i,4}$ | −0.3067 | −0.1373 | −0.2545 | −0.2870 | −0.1948 | −0.7304 |
| $\beta_{i,5}$ | −0.8326 | −1.0917 | −0.8531 | −0.5495 | −0.2500 | 0.2835 |
| $\beta_{i,6}$ | 1.4503 | 1.1133 | 0.8176 | 1.3875 | −0.1623 | 0.4340 |
| $\beta_{i,7}$ | 0.6638 | 0.4982 | 0.3884 | 0.0405 | 0.3954 | −0.0676 |
| $\beta_{i,8}$ | −0.2277 | −0.3260 | −0.5920 | −0.8833 | −0.4966 | −0.2996 |
| $\beta_{i,9}$ | 0.2493 | −0.0146 | 0.4681 | 0.0503 | −0.6338 | −0.0135 |
| $\beta_{i,10}$ | −0.8480 | 0.3254 | −0.0310 | 0.2479 | 0.2758 | −0.0399 |
| $\beta_{i,11}$ | −0.3632 | −0.5052 | 0.5157 | 0.0093 | 1.0958 | 0.3566 |
| $\beta_{i,12}$ | −0.1298 | 0.0696 | 0.5307 | 0.2423 | 0.2312 | −0.1894 |
| $\beta_{i,13}$ | 3.3420 | −0.5958 | −1.3049 | −0.2894 | −0.5655 | 0.3349 |
| $\beta_{i,14}$ | 1.1648 | 5.6659 | 1.1919 | 1.0715 | 0.7131 | 0.6184 |
| $\beta_{i,15}$ | −0.7904 | −0.0575 | 4.3753 | 0.0433 | 0.1759 | 0.0768 |
| $\beta_{i,16}$ | 0.2817 | 0.3132 | 0.3793 | 4.8584 | 0.3828 | 0.1333 |
| $\beta_{i,17}$ | 0.1199 | 0.4240 | 0.3486 | 0.5579 | 5.0758 | 0.8538 |
| $\beta_{i,18}$ | 0.0504 | 0.0885 | −0.6371 | −0.1830 | 0.5832 | 4.2329 |

TABLE 4-continued

Prediction Coefficients for Layer II: 44.1 kHz Audio

| | | | | | | |
|---|---|---|---|---|---|---|
| $\beta_{i,19}$ | 0.3694 | −0.5365 | 0.5251 | 0.8091 | 0.7703 | 0.7182 |
| $\beta_{i,20}$ | −0.3909 | −0.2736 | −0.8338 | −0.7046 | −0.2375 | 0.2030 |
| $\beta_{i,21}$ | −0.1979 | −0.1481 | −0.0332 | −0.2540 | −0.1725 | 0.9253 |
| $\beta_{i,22}$ | −0.5387 | −0.1930 | 0.4162 | −0.0887 | −0.1400 | −0.0162 |
| $\beta_{i,23}$ | −0.6735 | −0.7648 | −0.3193 | −0.2939 | 0.5383 | 0.2479 |
| $\beta_{i,24}$ | −0.3010 | −0.2550 | −0.8299 | −0.6217 | −0.1824 | 0.4166 |
| $\beta_{i,25}$ | −0.7076 | −0.6387 | −0.9475 | −1.4466 | −0.1877 | −0.6739 |
| $\beta_{i,26}$ | 1.2993 | 1.5936 | 0.9190 | 1.8248 | 0.3677 | 0.0344 |
| $\beta_{i,27}$ | 0.0191 | −0.2664 | 0.4663 | −0.2702 | 0.1597 | −0.2707 |
| $\beta_{i,28}$ | −0.7677 | −1.3338 | −0.4674 | −0.4114 | −0.2825 | 0.0564 |
| $\beta_{i,29}$ | −0.3052 | −0.5788 | −0.3467 | −0.4042 | −0.0791 | 0.5045 |
| $\beta_{i,30}$ | 0.3666 | −0.1946 | −1.9297 | −0.1584 | −0.6148 | −0.0993 |
| $\beta_{i,31}$ | 0.5185 | 0.1967 | −0.1752 | −0.7871 | 0.4143 | −0.2666 |
| $\beta_{i,32}$ | −1.7128 | −1.8878 | −1.1271 | −0.8648 | −1.3223 | −0.3072 |

| Coefficient | Subband $i = 19$ | Subband $i = 20$ | Subband $i = 21$ | Subband $i = 22$ | Subband $i = 23$ | Subband $i = 24$ |
|---|---|---|---|---|---|---|
| $\beta_{i,1}$ | −0.0485 | −0.0339 | −0.4940 | −0.2500 | −0.2398 | −0.3600 |
| $\beta_{i,2}$ | 0.2647 | −0.0294 | 0.0395 | 0.0025 | 0.1776 | 0.1191 |
| $\beta_{i,3}$ | 0.0471 | 0.2391 | 0.3646 | 0.2870 | −0.1482 | −0.0506 |
| $\beta_{i,4}$ | −0.1224 | −0.0058 | −0.0234 | 0.1898 | 0.2717 | 0.2731 |
| $\beta_{i,5}$ | −0.2295 | 0.0735 | 0.4098 | −0.1130 | 0.2586 | −0.2197 |
| $\beta_{i,6}$ | 0.2387 | −0.4301 | −0.5410 | −0.2607 | −0.2697 | 0.3032 |
| $\beta_{i,7}$ | 0.0495 | 0.4933 | 0.0448 | 0.4024 | −0.1867 | 0.1576 |
| $\beta_{i,8}$ | −0.2680 | −0.7624 | −0.0707 | −0.2902 | −0.2007 | −0.2316 |
| $\beta_{i,9}$ | 0.0527 | 0.3177 | −0.0853 | 0.0785 | −0.0756 | −0.1650 |
| $\beta_{i,10}$ | 0.2962 | −0.3306 | −0.4032 | −0.6841 | 0.2383 | 0.0124 |
| $\beta_{i,11}$ | 0.3909 | 0.0897 | 0.7569 | 0.2041 | −0.1864 | −0.1056 |
| $\beta_{i,12}$ | −0.3811 | 0.2900 | −0.4246 | −0.5780 | −0.1238 | −0.2029 |
| $\beta_{i,13}$ | 0.0619 | 0.0468 | 0.0987 | 0.1977 | 0.3736 | 0.1687 |
| $\beta_{i,14}$ | 1.1583 | 0.8883 | 0.3298 | 0.3915 | −0.0034 | 0.1759 |
| $\beta_{i,15}$ | 0.0434 | −0.0363 | 0.4752 | 0.3965 | −0.2699 | −0.1196 |
| $\beta_{i,16}$ | −0.0327 | 0.5979 | 0.5436 | 0.1287 | 0.1302 | −0.3522 |
| $\beta_{i,17}$ | −0.2731 | −0.2915 | −0.7558 | 0.3653 | 0.0992 | −0.1332 |
| $\beta_{i,18}$ | −0.1273 | −0.2421 | 0.3911 | 0.1373 | 0.4678 | 0.4055 |
| $\beta_{i,19}$ | 5.5714 | 0.6748 | −0.3235 | 0.5827 | 0.0745 | 0.5307 |
| $\beta_{i,20}$ | 0.4043 | 4.6221 | 1.3932 | 0.4878 | 0.0328 | −0.1948 |
| $\beta_{i,21}$ | 0.0577 | 1.1209 | 5.4071 | 0.8942 | 0.0214 | 0.7408 |
| $\beta_{i,22}$ | 0.6878 | 0.8483 | 0.4218 | 4.1846 | 0.7094 | 0.2846 |
| $\beta_{i,23}$ | 0.3209 | 0.7356 | 0.7075 | 0.4631 | 5.8810 | 0.7045 |
| $\beta_{i,24}$ | 0.2426 | −0.2516 | −0.0679 | 0.3256 | 0.4452 | 4.4781 |
| $\beta_{i,25}$ | 0.5458 | 0.5447 | 0.0416 | 0.7587 | 0.5337 | 0.7645 |
| $\beta_{i,26}$ | 0.2564 | −1.0755 | 0.3580 | 0.0440 | 0.6479 | 1.5115 |
| $\beta_{i,27}$ | −0.0808 | −0.0255 | −0.4927 | −0.5170 | −0.7761 | −0.3848 |
| $\beta_{i,28}$ | −1.1592 | −0.3195 | −0.2281 | −0.1046 | 0.5825 | 0.7565 |
| $\beta_{i,29}$ | 0.7718 | 0.4043 | 0.3381 | 0.1646 | −0.1260 | 0.0513 |
| $\beta_{i,30}$ | −0.5233 | 0.5524 | −0.1618 | 0.4835 | −0.5558 | 0.5927 |
| $\beta_{i,31}$ | 0.2348 | 0.1490 | −0.5860 | −0.5451 | −0.4079 | −0.7497 |
| $\beta_{i,32}$ | 0.1854 | 0.1415 | 0.5935 | 0.8133 | 0.6955 | −0.1939 |

| Coefficient | Subband $i = 25$ | Subband $i = 26$ | Subband $i = 27$ | Subband $i = 28$ | Subband $i = 29$ | Subband $i = 30$ |
|---|---|---|---|---|---|---|
| $\beta_{i,1}$ | −0.1550 | −0.0200 | 0.1174 | 0.0498 | −0.1578 | −0.1562 |
| $\beta_{i,2}$ | 0.1605 | −0.1625 | −0.1983 | 0.1010 | −0.3790 | 0.3099 |
| $\beta_{i,3}$ | 0.0590 | 0.1581 | 0.3025 | −0.0533 | 0.0488 | −0.3771 |
| $\beta_{i,4}$ | 0.0574 | 0.1310 | 0.0719 | 0.2966 | 0.2290 | 0.3475 |
| $\beta_{i,5}$ | −0.1564 | −0.1493 | −0.1036 | −0.4788 | 0.2358 | −0.0073 |
| $\beta_{i,6}$ | 0.0302 | 0.2663 | 0.1106 | −0.0153 | −0.3176 | −0.0200 |
| $\beta_{i,7}$ | 0.4498 | −0.1070 | 0.0433 | 0.3191 | 0.2023 | −0.1688 |
| $\beta_{i,8}$ | −0.2483 | 0.0137 | 0.1660 | −0.0093 | −0.1259 | 0.0162 |
| $\beta_{i,9}$ | −0.1811 | −0.1116 | −0.2952 | −0.1463 | −0.2163 | 0.3120 |
| $\beta_{i,10}$ | 0.1848 | 0.0518 | 0.2039 | 0.0580 | 0.0976 | −0.2136 |
| $\beta_{i,11}$ | −0.1308 | 0.2524 | −0.4377 | −0.1373 | −0.1875 | 0.0076 |
| $\beta_{i,12}$ | 0.1140 | −0.7126 | 0.1474 | −0.0623 | −0.3597 | −0.7670 |
| $\beta_{i,13}$ | 0.0066 | 0.1197 | 0.0739 | −0.3800 | 0.5235 | −0.0404 |
| $\beta_{i,14}$ | −0.2321 | 0.0934 | −0.2244 | 0.2301 | 0.3646 | 0.2632 |
| $\beta_{i,15}$ | 0.1612 | 0.4398 | 0.1587 | 0.4257 | 0.1155 | 0.3336 |
| $\beta_{i,16}$ | 0.1155 | 0.5785 | 0.3343 | 0.3222 | 0.1984 | 0.0597 |
| $\beta_{i,17}$ | −0.6569 | −0.5282 | −0.2154 | −0.0601 | 0.0122 | 0.3061 |
| $\beta_{i,18}$ | 0.4013 | 0.6469 | 0.4331 | −0.1212 | −0.5454 | −0.1215 |
| $\beta_{i,19}$ | 0.0582 | −0.1264 | −0.0503 | 0.6994 | 0.4843 | 0.1620 |
| $\beta_{i,20}$ | 0.3179 | −0.7231 | −0.5993 | −0.7145 | 0.0067 | −0.4917 |
| $\beta_{i,21}$ | 0.1719 | −0.1998 | 0.4064 | 0.4057 | 0.0105 | 0.3817 |
| $\beta_{i,22}$ | 0.3436 | 0.1850 | −0.0352 | −0.6742 | −1.5146 | 0.1600 |
| $\beta_{i,23}$ | 0.4617 | 0.1147 | −0.0673 | 0.2490 | 0.2047 | −0.0210 |

TABLE 4-continued

Prediction Coefficients for Layer II: 44.1 kHz Audio

| | | | | | | |
|---|---|---|---|---|---|---|
| $\beta_{i,24}$ | 0.3253 | 0.1603 | 0.3573 | 0.3972 | −0.2362 | 0.0544 |
| $\beta_{i,25}$ | 4.5404 | 2.1734 | 0.8058 | 0.6493 | 0.5042 | −0.7486 |
| $\beta_{i,26}$ | 1.1162 | 4.3780 | 1.6207 | 0.5467 | 0.6825 | 0.0874 |
| $\beta_{i,27}$ | 0.1208 | 0.8766 | 2.2766 | 0.1984 | 0.2400 | 0.0877 |
| $\beta_{i,28}$ | 1.6247 | 0.5639 | 1.7034 | 3.9863 | 1.2691 | 1.3673 |
| $\beta_{i,29}$ | −0.5361 | −0.1341 | 0.6578 | 1.1650 | 3.1758 | 0.8680 |
| $\beta_{i,30}$ | 0.5037 | −0.1750 | 0.3979 | 0.9975 | 1.4399 | 3.5743 |
| $\beta_{i,31}$ | −0.2560 | −0.3455 | −0.1783 | −0.3244 | 0.0858 | 1.1989 |
| $\beta_{i,32}$ | −0.3679 | 0.0333 | 0.2485 | −0.4472 | 1.1612 | −0.4377 |

| Coefficient | Subband i = 31 | Subband i = 32 | Constant Term $\beta_{k,33}, k = 1,2,\ldots,32$ |
|---|---|---|---|
| $\beta_{i,1}$ | 0.0000 | 0.0000 | 61.1770 |
| $\beta_{i,2}$ | 0.0000 | 0.0000 | 41.1430 |
| $\beta_{i,3}$ | 0.0000 | 0.0000 | 31.4470 |
| $\beta_{i,4}$ | 0.0000 | 0.0000 | 29.1800 |
| $\beta_{i,5}$ | 0.0000 | 0.0000 | 36.9870 |
| $\beta_{i,6}$ | 0.0000 | 0.0000 | 24.8860 |
| $\beta_{i,7}$ | 0.0000 | 0.0000 | 20.4090 |
| $\beta_{i,8}$ | 0.0000 | 0.0000 | 23.4100 |
| $\beta_{i,9}$ | 0.0000 | 0.0000 | 1.8837 |
| $\beta_{i,10}$ | 0.0000 | 0.0000 | −1.0521 |
| $\beta_{i,11}$ | 0.0000 | 0.0000 | 7.1428 |
| $\beta_{i,12}$ | 0.0000 | 0.0000 | −3.0178 |
| $\beta_{i,13}$ | 0.0000 | 0.0000 | 5.5368 |
| $\beta_{i,14}$ | 0.0000 | 0.0000 | 1.2677 |
| $\beta_{i,15}$ | 0.0000 | 0.0000 | −2.4966 |
| $\beta_{i,16}$ | 0.0000 | 0.0000 | 11.2500 |
| $\beta_{i,17}$ | 0.0000 | 0.0000 | 17.8550 |
| $\beta_{i,18}$ | 0.0000 | 0.0000 | 43.4680 |
| $\beta_{i,19}$ | 0.0000 | 0.0000 | 46.1350 |
| $\beta_{i,20}$ | 0.0000 | 0.0000 | 44.5340 |
| $\beta_{i,21}$ | 0.0000 | 0.0000 | 31.2180 |
| $\beta_{i,22}$ | 0.0000 | 0.0000 | 28.2240 |
| $\beta_{i,23}$ | 0.0000 | 0.0000 | 14.3030 |
| $\beta_{i,24}$ | 0.0000 | 0.0000 | 8.1030 |
| $\beta_{i,25}$ | 0.0000 | 0.0000 | 0.0626 |
| $\beta_{i,26}$ | 0.0000 | 0.0000 | −5.9461 |
| $\beta_{i,27}$ | 0.0000 | 0.0000 | −2.5182 |
| $\beta_{i,28}$ | 0.0000 | 0.0000 | −9.1175 |
| $\beta_{i,29}$ | 0.0000 | 0.0000 | 0.2438 |
| $\beta_{i,30}$ | 0.0000 | 0.0000 | −30.0680 |
| $\beta_{i,31}$ | 0.0000 | 0.0000 | −96.0000 |
| $\beta_{i,32}$ | 0.0000 | 0.0000 | −96.0000 |

Although the tables do not show values for Layer III, these values may be determined according the methodology set forth above in accordance with a preferred embodiment of the present invention. If values for $\beta_{i,j}$ corresponding to 32 and 48 kHz signals are desired, the methodology set forth above also may be utilized to determined the values in accordance with a preferred embodiment of the present invention.

In accordance with a preferred embodiment of the present invention, the process of the present invention may be "tuned" for a specific type of music. For example, if a user sending an audio signal for classic music desires to encode only the classical violin, samples from a classic violin source may be collected in estimating $\beta_{i,j}$'s. The estimated $\beta_{i,j}$'s will be better suited for classical violin. Furthermore, a user may obtain several sets of $\beta_{i,j}$'s corresponding to different types of music and one set may be selected by the user appropriately.

In accordance with a preferred embodiment of the present invention, squared-energy values for subband samples $S_{i,l}$ may be employed instead of absolute values in equation (6):

$$x_i = \log_{10}\left(\sum_{l=1}^{L}(S_{i,l})^2\right) \quad i = 1, 2, \ldots, 32 + C$$

The constant 'C' can be selected using empirical observations. By attempting to equate X's to normalized sound pressure levels, C can be set to about 82.53 dB. The determination of prediction coefficients, $\beta_{i,j}$, in equation (1) also will replace pseudo-energy values with squared-energy values in accordance with a preferred embodiment of the present invention. Data processing system 10 includes a system unit 2, a video display terminal 4, a keyboard 6, and a mouse 8. Data processing system 10 may be implemented utilizing any suitable computer, such as an IBM PS/2 or IBM RISC SYSTEM/6000 computer, both products of International Business Machines Corporation, located in Armonk, N.Y. "PS/2" and "RISC SYSTEM/6000" are trademarks of International Business Machines Corporation. Although, the depicted embodiment is a personal computer, a preferred embodiment of the present invention may be implemented in other types of data processing systems, such as, for example, intelligent workstations, mini computers, local area networks, or special purpose multimedia devices using standard digital signal processors.

Figure 7:
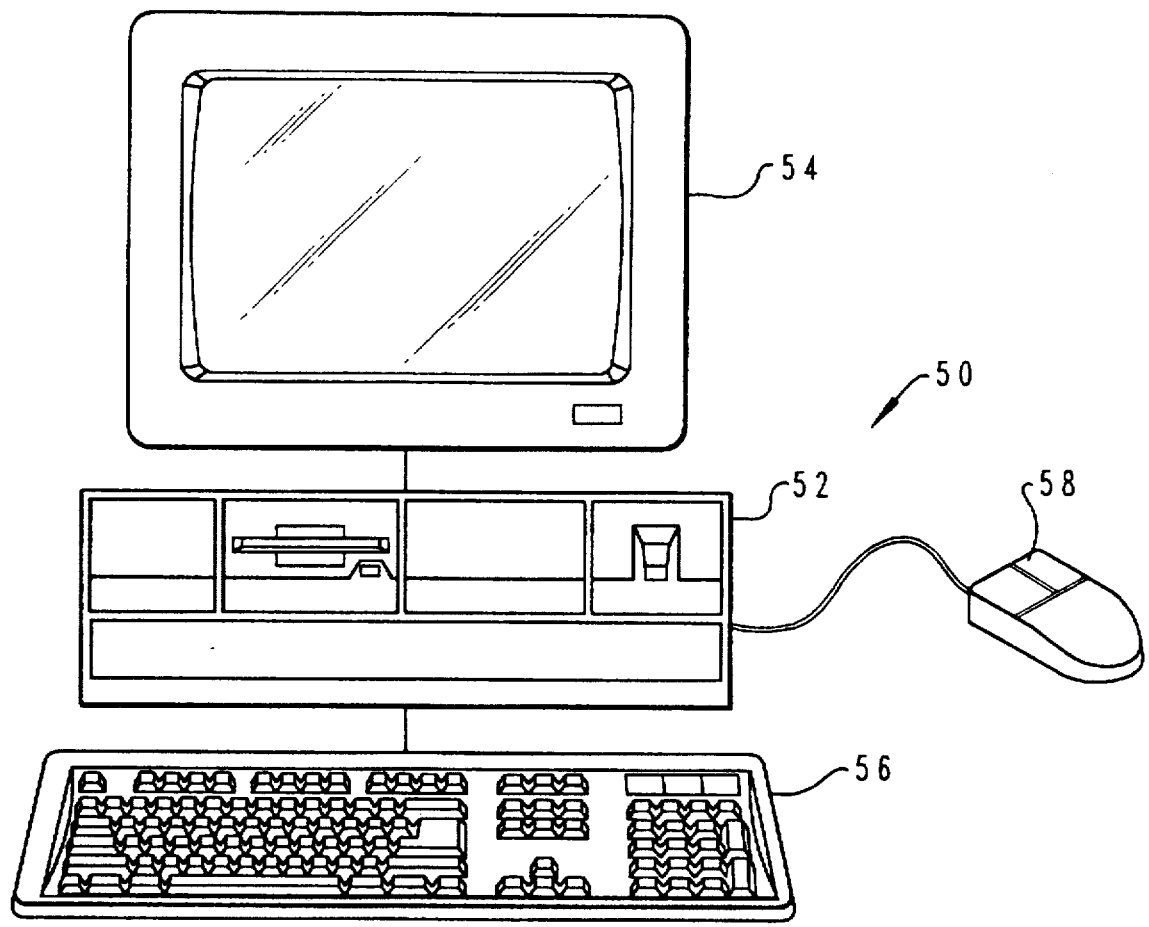
FIG. 7 depicts an illustration of a data processing system in which a preferred embodiment of the present invention may be implemented.
Figure 8:
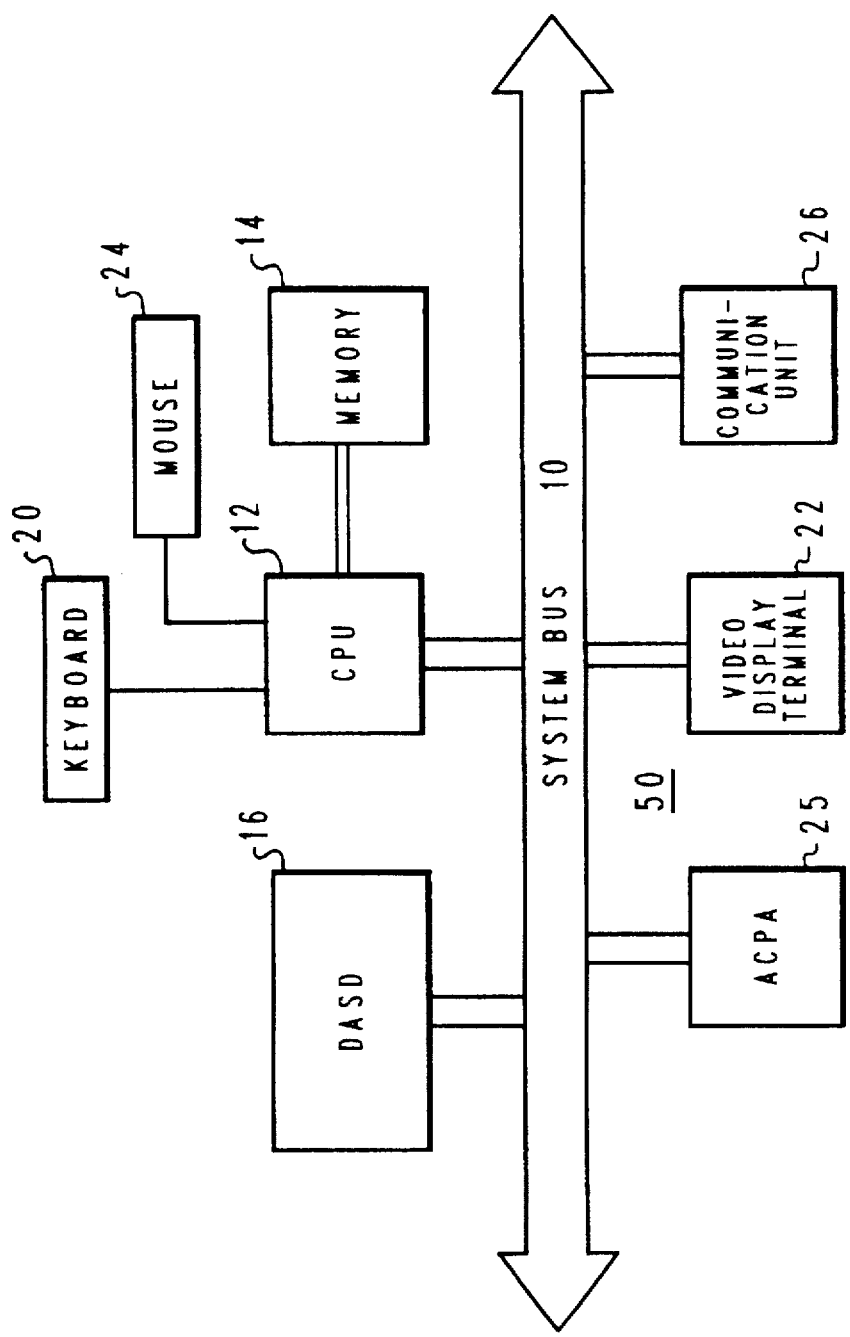
FIG. 8 is a block diagram of the data processing system depicted in FIG. 7 in accordance with a preferred embodiment of the present invention.

Referring now to FIG. 8, a block diagram of a data processing system 10 in FIG. 7 is illustrated in accordance with a preferred embodiment of the present invention. System bus 11 provides a connection between various components within data processing system 10. Central processing unit (CPU) 12 provides the decision making capability in data processing system 10. CPU 12 may include one or more processors, such as an 80486 processor or a Pentium processor available from Intel Corporation in Santa Clara, Calif. "Pentium" is a trademark of Intel Corporation. Other processors that may be used include Power PC available from IBM/Motorola or Alpha AXP processors from Digital Equipment.

Memory 14 provides a storage for data processing system 10 and may include both read only memory (ROM) and random access memory (RAM). Direct access storage device (DASD) 16 provides additional storage for data processing system 10. DASD 16 typically provides long term storage for data processing system 10. DASD 16 may include, for example, a hard disk drive or a floppy disk drive.

Various peripherals, such as keyboard 20, video display terminal 22, and mouse 24 may be utilized to interact with data processing system 10. According to a preferred embodiment of the present invention, an audio capture and playback adapter (ACPA) 25 may be employed to obtain audio samples. Specifically, an IBM Audio Capture and Playback Adapter, available from International Business Machines Corporation, may be utilized. Popular Sound Blaster and other sound cords may also be utilized, if audio data can be directly read from the CD or DAT, these sources also may be utilized.

Communications unit 26 provides the interface between the data processing system 10 and some other data processing system such as another personal computer or a network.

The digital audio signal processed by the present invention may originate from stored data in DASD 16, or may be received at communications unit 26, or from some other source of data that is connected to the data processing system, such as ACPA 25.

A preferred embodiment of the present invention may be implemented in an IBM RISC SYSTEM/6000 computer, which is a product of International Business Machines Corporation, located in Armonk, N.Y. "RISC SYSTEM/6000" is a trademark of International Business Machines Corporation. The processes of the present invention may be implemented within the data processing system depicted in FIGS. 7 and 8 or in hardware.

Accordingly, the present invention allows a simpler implementation than the process depicted in FIG. 1. The present invention also may be utilized with psychoacoustic models other than those specified by MPEG.

Single cycle multiply accumulate (MAC) operations required by the present invention are simpler to carry out in most DSPs. Hence, computing each $\beta_i$ in equation (6) may require as low as 33 instruction cycles in such processors.

Instead, of require two or more cycles, (multiplication and addition), the operation can be performed in one instruction cycle. Furthermore, in a fixed-point DSP, the truncation can be made to the result in the accumulator at the end of all addition, thus preventing round-off errors after each accumulation.

Furthermore, process of the present invention is faster because the number of instruction cycles required are much less than a process utilizing PM1 or PM2 in a standard DSP environment in accordance with a preferred embodiment of the present invention. The performance gains provided by the present invention provides a more efficient encoding process for data. Also, the a preferred embodiment of the present invention may be implemented with a single DSP.

Although the depicted embodiments are directed towards a audio compression scheme, the present invention may be utilized to provide subband coding for other data signals such as video. In video, subband coding employing a psychovisual weighting may be implemented in accordance with a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently compressing a digital audio signal, wherein said digital audio signal includes a plurality of samples, said method comprising:

separating each of said plurality of samples into a plurality of subbands;

predicting a signal to mask ratio for each of said plurality of subbands utilizing a model of relationships between energy values within each of said plurality of subbands and signal to mask ratios values based on a predetermined psychoacoustic model;

allocating a number of bits in response to said predicted signal to mask ratio and a preselected bit-rate; and quantizing each of said plurality of subbands based on said number of bits allocated, wherein said digital audio signal may be efficiently compressed.

2. The method of claim 1, wherein said step of predicting a signal to mask ratio includes predicting said signal to mask ratio as follows:

$$y_i = \sum_{j=1}^{N} \beta_{i,j} x_j + \beta_{i,33}$$

wherein $y_i$ is a signal to mask ratio for subband i,j is the sample frame, N is a number of sample frames, $\beta_{i,j}$ is a prediction coefficient, $\beta_{i,33}$ is a bias coefficient, and $x_j$ is an energy value for subband i.

3. The method of claim 2 further comprising ascertaining prediction coefficients as follows:

$$y_k(j) = \sum_{i=1}^{33} \beta_{k,i} x_i(j) + \epsilon_k(j), j = 1, 2, \ldots, N$$

wherein $Y_k(j)$ is a signal to mask ratio for a subband k at same frame j,k is a subband number, j is a frame number, N is a number of frames, $\epsilon_k(j)$ is a modeling error for subband k at frame j.

4. The method of claim 3 further comprising acquiring signal to mask ratios from a psychoacoustic model.

5. A data processing system for efficiently compressing a digital audio signal, wherein said digital audio signal includes a plurality of samples, said data processing system comprising:

separation means for separating each of said plurality of samples into a plurality of subbands;

prediction means for predicting a signal to mask ratio for each of said plurality of subbands utilizing a model of relationships between energy values within each of said plurality of subbands and signal to mask ratios values based on a predetermined psychoacoustic model;

allocation means for allocating a number of bits in response to said predicted signal to mask ratio and a preselected bit-rate; and quantization means for quantizing each of said plurality of subbands based on said number of bits allocated, wherein said digital audio signal may be efficiently compressed.

6. The data processing system of claim 5, wherein said prediction means includes means for predicting said signal to mask ratio as follows:

$$y_i = \sum_{j=1}^{N} \beta_{i,j} x_j + \beta_{i,33}$$

wherein $y_i$ is a signal to mask ratio for subband i,j is the sample frame, N is a number of sample frames, $\beta_{i,j}$ is a prediction coefficient, $\beta_{i,33}$ is a bias coefficient, and $x_j$ is an energy value for subband i.

7. The data processing system of claim 6 further comprising means for ascertaining prediction coefficients as follows:

$$y_k(j) = \sum_{i=1}^{33} \beta_{k,i} x_i(j) + \epsilon_k(j), j = 1, 2, \ldots, N$$

wherein $Y_k(j)$ is a signal to mask ratio for a subband k at same frame j,k is a subband number, j is a frame number, N is a number of frames, $\epsilon_k(j)$ is a modeling error for subband k at frame j.

8. The data processing system of claim 7 further comprising means for acquiring signal to mask ratios from a psychoacoustic model.

9. The data processing system of claim 8, wherein said psychoacoustic model is a psychoacoustic model specified by MPEG.

10. The data processing system of claim 9, wherein said psychoacoustic model is Psychoacoustic Model 2.

11. The data processing system of claim 6, wherein $x_j$ is a pseudo-energy value for subband j.

12. The data processing system of claim 6, wherein $x_j$ is a squared-energy value for subband j.

13. The data processing system of claim 6, wherein said data processing system is an IBM RISC SYSTEM/6000 computer.

14. The data processing system of claim 5, wherein said model is a plurality of prediction coefficients.

15. A computer program product for efficiently compressing a digital audio signal, wherein said digital audio signal includes a plurality of samples comprising:

first instruction means for separating each of said plurality of samples into a plurality of subbands;

second instruction means for predicting a signal to mask ratio for each of said plurality of subbands utilizing a model of relationships between energy values within each of said plurality of subbands and signal to mask ratios values based on a predetermined psychoacoustic model;

third instruction means for allocating a number of bits in response to said predicted signal to mask ratio and a preselected bit-rate; and fourth instruction means for quantizing each of said plurality of subbands based on said number of bits allocated, wherein said digital audio signal may be efficiently compressed.

16. An apparatus for efficiently compressing a digital audio signal, wherein said digital audio signal includes a plurality of samples, said data processing system comprising:

separation means for separating each of said plurality of samples into a plurality of subbands;

prediction means for predicting a signal to mask ratio for each of said plurality of subbands utilizing a model of relationships between energy values within each of said plurality of subbands and signal to mask ratios values based on a predetermined psychoacoustic model;

allocation means for allocating a number of bits in response to said predicted signal to mask ratio and a preselected bit-rate; and quantization means for quantizing each of said plurality of subbands based on said number of bits allocated, wherein said digital audio signal may be efficiently compressed.

17. The apparatus of claim 16, wherein said prediction means includes means for predicting said signal to mask ratio as follows:

$$y_i = \sum_{j=1}^{N} \beta_{i,j} x_j + \beta_{i,33}$$

wherein $y_i$ is a signal to mask ratio for subband i,j is the sample frame, N is a number of sample frames, $\beta_{i,j}$ is a prediction coefficient, $\beta_{i,33}$ is a bias coefficient, and $x_j$ is an energy value for subband i.

18. A data processing system comprising:

a processor;

a digital audio source that provides a digital audio signal, wherein said digital audio signal includes a plurality of samples;

separation means for separating each of said plurality of samples into a plurality of subbands;

processor means for predicting a signal to mask ratio for each of said plurality of subbands utilizing a model of relationships between energy values within each of said plurality of subbands and signal to mask ratios values based on a predetermined psychoacoustic model;

processor means for allocating a number of bits in response to said predicted signal to mask ratio and a preselected bit-rate; and processor means for quantizing each of said plurality of subbands based on said number of bits allocated, wherein said digital audio signal may be efficiently compressed.

19. The data processing system of claim 18, wherein said separation means is a processor including instruction means for separating each of said plurality of samples into a plurality of subbands.

20. The data processing system of claim 18, wherein said processor means for predicting includes means for predicting said signal to mask ratio as follows:

$$y_i = \sum_{j=1}^{N} \beta_{i,j} x_j + \beta_{i,33}$$

wherein $y_i$ is a signal to mask ratio for subband i,j is the sample frame, N is a number of sample frames, $\beta_{i,j}$ is a prediction coefficient, $\beta_{i,33}$ is a bias coefficient, and $x_j$ is an energy value for subband i.

21. The data processing system of claim 20 further comprising means for ascertaining prediction coefficients as follows:

$$y_k(j) = \sum_{i=1}^{33} \beta_{k,i} x_i(j) + \epsilon_k(j), j = 1, 2, \ldots, N$$

wherein $Y_k(j)$ is a signal to mask ratio for a subband k at same frame j,k is a subband number, j is a frame number, N is a number of frames, $\epsilon_k(j)$ is a modeling error for subband k at frame j.

22. A method in a data processing system for efficiently compressing a digital audio signal, wherein said digital audio signal includes a plurality of samples, said method comprising:

separating each of said plurality of samples into a plurality of subbands; and predicting a signal to mask ratio for each of said plurality of subbands utilizing a model of the relationships between energy values within each of said plurality of subbands and signal to mask ratio values based on a predetermined psychoacoustic model, wherein said model includes a matrix of prediction coefficients indexed by subbands.

23. A data processing system for efficiently compressing a digital audio signal, wherein said digital audio signal includes a plurality of samples, said data processing system comprising:

separation means for separating each of said plurality of samples into a plurality of subbands; and predicting means for predicting a signal to mask ratio for each of said plurality of subbands utilizing a model of the relationships between energy values within each of said plurality of subbands and signal to mask ratio values based on a predetermined psychoacoustic model, wherein said model includes a matrix of prediction coefficients indexed by subbands.

\* \* \* \* \*